(12) United States Patent
Yeh et al.

(10) Patent No.: US 12,289,205 B2
(45) Date of Patent: *Apr. 29, 2025

(54) NETWORK AND METHOD FOR SERVICING A COMPUTATION REQUEST

(71) Applicant: Northeastern University, Boston, MA (US)

(72) Inventors: Edmund Meng Yeh, Newton, MA (US); Khashayar Kamran, Allston, MA (US)

(73) Assignee: Northeastern University, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,973

(22) Filed: Feb. 29, 2024

(65) Prior Publication Data

US 2024/0205083 A1 Jun. 20, 2024

Related U.S. Application Data

(63) Continuation of application No. 18/302,959, filed on Apr. 19, 2023, now Pat. No. 11,962,463, which is a
(Continued)

(51) Int. Cl.
*G06F 15/177* (2006.01)
*G06F 9/54* (2006.01)
(Continued)

(52) U.S. Cl.
CPC ............ *H04L 41/082* (2013.01); *G06F 9/547* (2013.01); *H04L 67/10* (2013.01); *H04L 67/568* (2022.05); *H04L 69/03* (2013.01)

(58) Field of Classification Search
CPC .................. H04L 41/082; H04L 67/10; H04L 67/2842; H04L 69/03; H04L 45/14; H04L 45/26;
(Continued)

(56) References Cited

U.S. PATENT DOCUMENTS 5,875,464 A 2/1999 Kirk
6,772,193 B1 8/2004 Igawa et al.
(Continued)

FOREIGN PATENT DOCUMENTS

CN 1481635 A 3/2004
CN 101410819 A 4/2009
(Continued)

OTHER PUBLICATIONS

Abedini, N. and S. Shakkottai, "Content Caching and Scheduling in Wireless Broadcast Networks with Elastic and Inelastic Traffic," IEEE/ACM Transactions on Networking, 22(3): 864-874 (2014).
(Continued)

*Primary Examiner* — Dustin Nguyen
*Assistant Examiner* — Hao H Nguyen
(74) *Attorney, Agent, or Firm* — Hamilton, Brook, Smith & Reynolds, P.C.

(57) ABSTRACT

A framework for joint computation, caching, and request forwarding in data-centric computing-based networks comprises a virtual control plane, which operates on request counters for computations and data, and an actual plane, which handles computation requests, data requests, data objects and computation results in the physical network. A throughput optimal policy, implemented in the virtual plane, provides a basis for adaptive and distributed computation, caching, and request forwarding in the actual plane. The framework provides superior performance in terms of request satisfaction delay as compared with several baseline policies over multiple network topologies.

20 Claims, 22 Drawing Sheets

Related U.S. Application Data continuation of application No. 16/920,215, filed on Jul. 2, 2020, now Pat. No. 11,677,625.

(60) Provisional application No. 62/869,960, filed on Jul. 2, 2019.

(51) Int. Cl.
  *H04L 41/082* (2022.01)
  *H04L 67/10* (2022.01)
  *H04L 67/568* (2022.01)
  *H04L 69/00* (2022.01)

(58) Field of Classification Search
  CPC ..... H04L 45/70; H04L 45/742; H04L 47/125; H04L 47/17; G06F 9/547
  See application file for complete search history.

(56) References Cited

U.S. PATENT DOCUMENTS

| | | |
|---|---|---|
| 7,395,348 B1 | 7/2008 | Cieslak et al. |
| 7,516,198 B1 | 4/2009 | Appala et al. |
| 7,536,693 B1 | 5/2009 | Manczak et al. |
| 7,660,296 B2 | 2/2010 | Fletcher et al. |
| 7,680,875 B1 | 3/2010 | Shopiro et al. |
| 7,725,598 B2 | 5/2010 | Cieslak et al. |
| 8,170,017 B2 | 5/2012 | Fletcher et al. |
| 8,204,060 B2 | 6/2012 | Jacobson et al. |
| 8,386,622 B2 | 2/2013 | Jacobson |
| 8,762,570 B2 | 6/2014 | Qian et al. |
| 8,891,522 B2 | 11/2014 | Fletcher et al. |
| 9,065,809 B2 | 6/2015 | Kling et al. |
| 9,270,582 B2 | 2/2016 | Lih et al. |
| 9,559,889 B1 | 1/2017 | Mncent et al. |
| 9,619,542 B2 | 4/2017 | Kamath et al. |
| 10,101,981 B2 | 10/2018 | Arumugam et al. |
| 10,291,748 B1 | 5/2019 | Dods |
| 10,523,777 B2 | 12/2019 | Yeh et al. |
| 10,530,893 B2 | 1/2020 | Rossi et al. |
| 10,824,409 B2 | 11/2020 | Arumugam et al. |
| 11,115,284 B1 * | 9/2021 | Paiva .................. H04L 41/082 |
| 11,258,879 B2 | 2/2022 | Ioannidis et al. |
| 11,336,473 B2 | 5/2022 | Yeh et al. |
| 11,349,948 B2 | 5/2022 | Mahdian et al. |
| 11,677,625 B2 | 6/2023 | Yeh et al. |
| 11,902,184 B2 | 2/2024 | Gai et al. |
| 11,926,463 B2 | 3/2024 | Clapp et al. |
| 11,962,463 B2 | 4/2024 | Yeh et al. |
| 12,155,738 B2 | 11/2024 | Yeh et al. |
| 2003/0215006 A1 | 11/2003 | Raghothaman |
| 2004/0034746 A1 | 2/2004 | Horn et al. |
| 2004/0215805 A1 | 10/2004 | Tan et al. |
| 2004/0258088 A1 | 12/2004 | Clark et al. |
| 2007/0153782 A1 | 7/2007 | Fletcher et al. |
| 2007/0268816 A1 | 11/2007 | Hosein |
| 2008/0091840 A1 | 4/2008 | Guo et al. |
| 2008/0222305 A1 | 9/2008 | Cieslak et al. |
| 2009/0043729 A1 | 2/2009 | Liu et al. |
| 2009/0287835 A1 | 11/2009 | Jacobson |
| 2010/0057908 A1 | 3/2010 | Smith et al. |
| 2010/0095012 A1 | 4/2010 | Zuckerman et al. |
| 2010/0138488 A1 | 6/2010 | Fletcher et al. |
| 2011/0122878 A1 | 5/2011 | Li et al. |
| 2011/0153724 A1 | 6/2011 | Raja et al. |
| 2012/0072526 A1 | 3/2012 | Kling et al. |
| 2012/0158912 A1 | 6/2012 | Jacobson |
| 2012/0163180 A1 | 6/2012 | Goel |
| 2012/0209942 A1 | 8/2012 | Zehavi et al. |
| 2012/0215938 A1 | 8/2012 | Fletcher et al. |
| 2012/0317307 A1 | 12/2012 | Ravindran et al. |
| 2013/0013726 A1 | 1/2013 | Westberg et al. |
| 2013/0018937 A1 | 1/2013 | Kim et al. |
| 2013/0179490 A1 | 7/2013 | Naga et al. |
| 2013/0198351 A1 | 8/2013 | Widjaja et al. |
| 2013/0235880 A1 | 9/2013 | Goldman et al. |
| 2013/0268733 A1 | 10/2013 | Narayanan et al. |
| 2013/0275543 A1 | 10/2013 | Jain |
| 2013/0336320 A1 | 12/2013 | Rangaraman |
| 2013/0339516 A1 | 12/2013 | Chauhan et al. |
| 2014/0036919 A1 | 2/2014 | Lih et al. |
| 2014/0164552 A1 | 6/2014 | Kim et al. |
| 2014/0172981 A1 | 6/2014 | Kim et al. |
| 2014/0173034 A1 | 6/2014 | Liu et al. |
| 2014/0304231 A1 | 10/2014 | Kamath et al. |
| 2014/0304355 A1 | 10/2014 | Kamath et al. |
| 2014/0344326 A1 | 11/2014 | Kamath et al. |
| 2015/0074187 A1 | 3/2015 | Fletcher et al. |
| 2015/0350078 A1 * | 12/2015 | Azgin .................. H04L 45/745 370/392 |
| 2016/0014027 A1 | 1/2016 | Oran et al. |
| 2016/0043940 A1 * | 2/2016 | Mahadevan .......... H04L 45/566 709/223 |
| 2016/0065689 A1 | 3/2016 | Imai |
| 2016/0149810 A1 | 5/2016 | Liu |
| 2016/0234333 A1 * | 8/2016 | Yeh ........................ H04L 45/64 |
| 2016/0255169 A1 | 9/2016 | Kovvuri et al. |
| 2016/0328222 A1 | 11/2016 | Arumugam et al. |
| 2017/0041421 A1 | 2/2017 | Liu |
| 2019/0004780 A1 | 1/2019 | Arumugam et al. |
| 2019/0339688 A1 | 11/2019 | Cella et al. |
| 2020/0137192 A1 | 4/2020 | Ioannidis et al. |
| 2020/0162574 A1 | 5/2020 | Yeh et al. |
| 2020/0328905 A1 | 10/2020 | Yeh et al. |
| 2020/0412836 A1 * | 12/2020 | Arrobo Vidal ........ H04L 67/568 |
| 2021/0006459 A1 | 1/2021 | Yeh et al. |
| 2021/0112135 A1 | 4/2021 | Mahdian et al. |
| 2021/0126966 A1 | 4/2021 | Gandhi et al. |
| 2022/0377027 A1 | 11/2022 | Gai et al. |
| 2023/0254206 A1 | 8/2023 | Yeh et al. |
| 2024/0205083 A1 * | 6/2024 | Yeh ....................... H04L 67/568 |

FOREIGN PATENT DOCUMENTS

| | | |
|---|---|---|
| CN | 102783090 A | 11/2012 |
| CN | 103384989 A | 11/2013 |
| CN | 104364761 A | 2/2015 |
| CN | 104365058 A | 2/2015 |
| CN | 104365067 A | 2/2015 |
| CN | 105393220 A | 3/2016 |
| CN | 106686060 A | 5/2017 |
| CN | 110313163 A | 10/2019 |
| EP | 3053055 A2 | 8/2016 |
| WO | 02/35799 A2 | 5/2002 |
| WO | 2007/089352 A2 | 8/2007 |
| WO | 2014/022494 A1 | 2/2014 |
| WO | 2015/048773 A2 | 4/2015 |
| WO | 2015/161737 A1 | 10/2015 |
| WO | 2018/236723 A1 | 12/2018 |
| WO | 2019/075363 A1 | 4/2019 |
| WO | 2021/003422 A1 | 1/2021 |

OTHER PUBLICATIONS

Ageev, et al., "Pipage Rounding: A New Method of Constructing Algorithms with Proven Performance Guarantee," Journal of Combinatorial Optimization, 8, 307-328, 2004.
Albers, S., "Online algorithms: A Survey," Mathematical Subject Classification (1991).
Applegate, D., et al., "Optimal Content Placement for a Large-Scale VoD system," in IEEE/ACM Transactions on Networking, vol. 24, No. 4, Aug. 2016.
Avrachenkov, "Congestion Control of TCP Flows in Internet Routers by Means of Index Policy", forum, Sep. 18, 2012. Retrieved on [Jan. 28, 2015]. Retrieved from the internet <URL:https://archive.org/stream/arxiv-1209.363811209.3638_djvu.txt >.
Baev, I., et al., "Approximation Algorithms for Data Placement Problems," SIAM Journal on Computing, 38(4): 1411-1429 (2008).
Bartal, Y., et al., "Competitive Algorithms for Distributed Data Management," Journal of Computer and System Sciences, 51(3): 341-358 (1995).

(56) References Cited

OTHER PUBLICATIONS

Berger, D. S., et al., "Exact Analysis of TTL Cache Networks. The Case of Caching Policies driven by Stopping Times," IFIP Performance, Feb. 24, 2014.
Bjurefors et al., "Interest Dissemination in a Searchable Data-Centric Opportunistic Network" Wireless Conference (EW), 2010 European.
Blaszczyszyn, B. and A. Giovanidis, "Optimal Geographic Caching In Cellular Networks," in ICC, 2015.
Borst, S., et al., "Distributed Caching Algorithms for Content Distribution Networks," in INFOCOM, 2010.
Calinescu, G., et al., "Maximizing a Monotone Submodular Function Subject To A Matroid Constraint," in SIAM J. Comput., vol. 40, No. 6, 2011, pp. 1740-1766.
Carofiglio, G., et al., "Joint forwarding and caching with latency awareness in information-centric networking," Computer Networks, vol. 110, pp. 133-153 (Dec. 2016).
Chai, W., et al., "Cache "Less for More" in Information-Centric Networks" In Proceedings of the 11th International IFIP TC 6 Conference on Networking, Part I, IFIP' 12, pp. 27-40, Berlin, Heidelberg, 2012. Springer-Verlag.
Che, H., et al., "Hierarchical Web Caching Systems: Modeling, Design and Experimental Results," IEEE Journal on Selected Areas in Communications, vol. 20, No. 7, pp. 1305-1314, Sep. 2002.
Chiocchetti, R., et al., "Exploit the Known or Explore the Unknown? Hamlet-Like Doubts in ICN" ICN '12, Aug. 17, 2012.
Cohen, E. and S. Shenker, "Replication Strategies in Unstructured Peer-to-Peer Networks," in SIGCOMM, Aug. 19-23, 2002.
Cormen, T., et al., "Introduction to Algorithms" Third Edition, MIT Press, 2009.
Dehghan, M., et al., "A Utility Optimization Approach to Network Cache Design," in INFOCOM, Jan. 25, 2016.
Dehghan, M., et al., "On the Complexity of Optimal Routing and Content Caching in Heterogeneous Networks," in INFOCOM, 2014.
Edmonds, J., "Submodular Functions, Matroids, and Certain Polyhedra," Edited by G. Goos, J. Hartmanis, and J. van Leeuwen, LNCS 2570, pp. 11-26, 2003, Springer-Verlag Berlin Heidelberg 2003.
Eppstein, D., "Finding the k Shortest Paths," Department of Information and Computer Science, University of California, 26 pages, Mar. 31, 1997.
Fayazbakhsh, S. K., et al., "Less Pain, Most of the Gain: Incrementally Deployable ICN," in ACM SIGCOMM Computer Communication Review, vol. 43, No. 4, ACM, 2013, pp. 147-158.
Feng, H., et al., "Optimal Dynamic Cloud Network Control," in IEEE/ACM Transactions on Networking, vol. 26, No. 5, pp. 2118-2131 (Oct. 2018).
Fleischer, L., et al., "Tight Approximation Algorithms for Maximum General Assignment Problems," in SODA, 2006.
Fofack, N. C., et al., "Analysis of TTL-based Cache Networks," in ValueTools, 2012.
Fricker, C., et al., "A Versatile and Accurate Approximation for LRU Cache Performance," in ITC, Feb. 17, 2012.
Goemans, M. X. and D. P. Williamson, "New 3/4-Approximation Algorithms for The Maximum Satisfiability Problem," SIAM Journal on Discrete Mathematics, vol. 7, No. 4, pp. 656-666, Nov. 1994.
He, J. and J. Rexford, "Toward Internet-wide Multipath Routing," IEEE network, 22(2) (2008).
Hopps, C. E., "Analysis of an Equal-Cost Multi-Path Algorithm," NextHop Technologies, Nov. 2000, RFC2992.
International Preliminary Report on Patentability for Int'l Application No. PCT/US2020/040743, titled: Network and Method for Servicing a Computation Request, Dated: Dec. 28, 2021.
International Search Report and Written Opinion received for PCT Patent Application No. PCT/US2020/040743, mailed on Sep. 23, 2020, 12 pages.
Ioannidis et al., "Adaptive Caching Networks with Optimality Guarantees," Measurement and Modeling of Computer Science, Jun. 14, 2016, pp. 113-124.
Ioannidis, et al., "Jointly Optimal Routing and Caching for Arbitrary Network Topologies," in ACM ICN, Aug. 20, 2017.
Ioannidis, S. and P. Marbach, "Absence of Evidence as Evidence of Absence: A Simple Mechanism for Scalable P2P Search," in Technical Report, University of Toronto, CNRL-08-001, Aug. 29, 2008.
J. Mo and J. Walrand, Fair End-to-End Window-Based Congestion Control. IEEE/ACM Trans. Networking, vol. 8, No. 5, pp. 556-567, Oct. 2000.
Jacobson, V., et al., "Networking Named Content," in CoNEXT'09, Dec. 1-4, 2009.
Jiang, W., et al., "Orchestrating Massively Distributed CDNs," in CoNEXT'12, Dec. 10-13, 2012.
Jonathan, A. et al.,"Locality-Aware Load Sharing in Mobile Cloud Computing,", Proceedings of the 10th International conference on Utility and Cloud Computing, (Dec. 5, 2017), pp. 141-150.
Krause, A. and D. Golovin, "Submodular function maximization," 28 pages, 2012.
Kurose, J. F. and K. W. Ross, "Computer Networking: a Top-Down Approach," Addison Wesley, 2007.
L. Georgiadis, et al., "Resource Allocation and Cross-Layer Control in Wireless Networks" Foundations and Trends in Networking, vol. 1, No. 1, pp. 1-144, 2006.
L. Tassiulas and A. Ephremides, "Stability Properties of Constrained Queueing Systems and Scheduling Policies for Maximum Throughput in Multihop Radio Networks" IEEE Trans. Autom. Control, 37(12): 1936-1949, Dec. 1992.
L. Zhang, et al., "Named Data Networking (NDN) Project" Technical Report NDN-0001, Oct. 2010.
Laoutaris, N., et al., "Meta Algorithms for Hierarchical Web Caches," in ICPCC, 2004.
Laoutaris, N., et al., "The LCD interconnection of LRU caches and its analysis," Dept. of Informatics and Telecommunications, University of Athens, 33 pages (2006).
Liu et al., "Joint Caching, Forwarding and Congestion Control in Named Data Networks: Implementation and Experimental Analysis," Apr. 2016.
Loynes, "The Stability of a Queue with Non-Independent Inter-Arrival and Service Times," Mathematical Proceedings of the Cambridge Philosophical Society, vol. 58, pp. 497-520, 1962.
M. Amble, et al., "Content-Aware Caching and Traffic Management in Content Distribution Networks" In Proceedings of IEEE Infocom 2011, pp. 2858-2866, Shanghai, China, Apr. 2011.
M.J. Neely, E. Modiano, and C.E. Rohrs, "Dynamic Power Allocation and Routing for Time-Varying Wireless Networks" IEEE J. Sel. Areas Commun., vol. 23, No. 1, pp. 89-103, Jan. 2005.
Marina, M. K. and S. R. Das, "On-demand Multipath Distance Vector Routing in Ad Hoc Networks," in Network Protocols, 2001. Ninth International Conference on IEEE, 2001, pp. 14-23.
Martina, V., et al., "A unified approach to the performance analysis of caching systems," in INFOCOM, Feb. 25, 2016.
Michelot, C., "A Finite Algorithm for Finding the Projection of a Point onto the Canonical Simplex of Rn," Journal of Optimization Theory and Applications, vol. 50, No. 1, pp. 195-200, Jul. 1986.
Naveen, K., et al., "On the Interaction between Content Caching and Request Assignment in Cellular Cache Networks," in AllThingsCellular '15, Aug. 17-21, 2015.
Nemhauser, G. L. and L. A. Wolsey, "Best Algorithms for Approximating the Maximum of a Submodular Set Function," Mathematics of operations research, 3(3): 177-188 (1978).
Nemhauser, G. L., et al., "An Analysis of Approximations for Maximizing Submodular Set Functions—I," Mathematical Programming, 14(1), pp. 265-294 (Dec. 1978).
Nemirovski, A., "Efficient Methods in Convex Programming," Technion—The Israel Institute of Technology, Fall semester 1994/1995.
Nitzberg, B. and V. Lo, "Distributed Shared Memory: A Survey of Issues and Algorithms," Computer, 24(8): 52-60, Aug. 1991.
Papadimitriou, C. H. and K. Steiglitz, "Combinatorial Optimization: Algorithms and Complexity," Courier Corporation, 1982.
Podlipnig, S. and L. Boszormenyi, "A Survey of Web Cache Replacement Strategies," ACM Computing Surveys (CSUR), vol. 35, No. 4, pp. 374-398, Dec. 2003.

(56) References Cited

OTHER PUBLICATIONS

Poularakis, et al., "Approximation Caching and Routing Algorithms for Massive Mobile Data Delivery," Globecom 2013-Wireless Communications Symposium.
Psaras, I., et al., "Probabilistic In-Network Caching for Information-Centric Networks," in ICN, Aug. 2012.
Rosensweig, E. J., et al., "Approximate Models for General Cache Networks," in INFOCOM IEEE, 2010, pp. 1-9.
Rosensweig, E. J., et al., "On the Steady-State of Cache Networks," in INFOCOM, 2013.
Rossi, D. and G. Rossini, "Caching performance of content centric networks under multi-path routing (and more)," Telecom ParisTech, Tech. Rep., 2011.
Rossini, G. and D. Rossi, "Coupling Caching and Forwarding: Benefits, Analysis, and Implementation," in Proceedings of the 1st international conference on Information-centric networking ACM, 2014, pp. 127-136.
RouteFlow Project. web.archive.org/web/20131110183952/https://sites.google.com/site/routeflow/, accessed Nov. 10, 2013.
S. Eum et al., "CATT: Potential Based Routing with Content Caching for ICN" In Proceedings of SIGCOMM 2012 ICN, pp. 49-54, Helsinki, Finland, Aug. 2012.
S. Gitzenis, G. S. Paschos, and L. Tassiulas, "Asymptotic Laws for Content Replication and Delivery in Wireless Networks" In Proceedings of IEEE Infocom 2012, pp. 531-539, Orlando, Florida, USA, Mar. 2012.
Shanmugam, K., et al., "Femtocaching: Wireless content delivery through distributed caching helpers," Transactions on Information Theory, 59(12): 8402-8413 (2013).
Truong et al., "Chemical reaction optimization with greedy strategy for the 0-1 knapsack problem" Applied Soft Computing 13 (2013) 1774-1780.
Vondrák, J., "Optimal Approximation for the Submodular Welfare Problem in the Value Oracle Model," in STOC, May 2008.
Vutukury, S. and J. J. Garcia-Luna-Aceves, "MDVA: A Distance-Vector Multipath Routing Protocol," in INFOCOM 2001. Twentieth Annual Joint Conference of the IEEE Computer and Communications Societies. Proceedings. IEEE, vol. 1, 2001, pp. 557-564.
Wang J. et al., "An Optimal Cache Management Framework for Information-Centric Networks with Network Coding,"2014 IFIP Networking Conference, IFIP, Jun. 2, 2014, pp. 1-9.
Wang, Y., et al., "Optimal Cache Allocation for Content-Centric Networking," in 2013 21st IEEE International Conference on Network Protocols (ICNP). IEEE, 2013, pp. 1-10.
Xie, et al., "TECC: Towards Collaborative In-network Caching Guided by Traffic Engineering," The 31st Annual IEEE International Conference on Computer Communications: Mini-Conference, 2012.
Yang, C.-S. et al., "Communication-Aware Scheduling of Serial Tasks for Dispersed Computing," in IEEE/ACM Transactions on Networking, vol. 27, No. 4, pp. 1330-1343 (May 25, 2019).
Yeh, E. et al., Vip: A Framework for Joint Dynamic Forwarding and Caching in Named Data Networks, ACM-ICN '14: Proceedings of the 1st ACM Conference on Information-Centric Networking, pp. 117-126 (Sep. 2014).
Yeh, et al., Forwarding, Caching and Congestion Control in Named Data Networks, Proceedings of the 1st ACM Conference on Information-Centric Networking, version 3, Feb. 26, 2016.
Yen, J. Y., "Finding the k Shortest Loopless Paths in a Network," Management Science, vol. 17, No. 11, pp. 712-716, Jul. 1971.
Yi, C., et al., "Adaptive Forwarding in Named Data Networking," ACM SIGCOMM Comput. Commun. Rev., vol. 42, No. 3, pp. 62-67, Jul. 2012.
Z. Ming, et al., "Age-based Cooperative Caching in Information-Centric Networks," In Computer Communications Workshops (INFOCOM WKSHPS), 2012 IEEE Conference on, pp. 268-273, Mar. 2012.
Zhang et al., "Solving 0-1 knapsack problems based on amoeboid organism algorithm" Applied Mathematics and Computation 219 (2013) 9959-9970.
Zhang, et al., "Service-centric traffic engineering and cache orchestration in an ICN-enabled network," IEEE CCNC Conference, 2014.
Zhang, J. et al., "Optimal Control of Distributed Computing Networks with Mixed-Cast Traffic Flows," IEEE INFOCOM 2018—IEEE Conference on Computer Communications, Honolulu, HI, pp. 1880-1888 (2018).
Zhou, Y., et al., "Second-Level Buffer Cache Management," IEEE Transactions on Parallel and Distributed Systems, vol. 15, No. 7, Jul. 2004.
Benson, E., "Sync kit: a persistent client-side database caching toolkit for data intensive websites", Proceedings of the 19th international conference on World wide web, Apr. 26, 2010, 10 pages.
Chen, T., "Obtaining the optimal cache document replacement policy for the caching system of an EC website", European Journal of Operational Research, vol. 181, No. 2, Sep. 1, 2007, pp. 828-841.
Feder, T., "Combining request scheduling with web caching", Theoretical Computer Science, vol. 324, No. 2-3, Sep. 20, 2004, pp. 201-218.
Frey, D., et al., "Behave: Behavioral Cache for Web Content", Lecture Notes in Computer Science, vol. 8460, Nov. 4, 2014, 17 pages.
Kumar, C., et al., "A new approach for a proxy-level web caching mechanism", Decision Support Systems, vol. 46, No. 1, Dec. 2008, pp. 52-60.
Kumar, C., et al., "Accelerating the Internet in the presence of Big Data: Reducing user delays by leveraging historical user request patterns for web caching", Journal of Information Systems and Technology Management, vol. 16, 2019, 10 pages.
Li, W.S., et al., "Multitiered Cache Management and Acceleration for Database-Driven Websites", Concurrent Engineering, vol. 12, No. 3, 2004, 15 pages.
Qian, F., et al., "Web Caching on Smartphones: Ideal vs. Reality", Research Gate, Jun. 2012, 15 pages.
Rosen, S., et al., "Push or Request: An Investigation of HTTP/2 Server Push for Improving Mobile Performance", Proceedings of the 26th International Conference on World Wide Web, Apr. 30, 2017, pp. 459-468.
Sarhan, A., "New Web cache replacement approaches based on internal requests factor", 2014 9th International Conference on Computer Engineering & Systems (ICCES), 2014, 7 pages.

* cited by examiner

NETWORK AND METHOD FOR SERVICING A COMPUTATION REQUEST

RELATED APPLICATIONS

This application is a continuation of U.S. application Ser. No. 18/302,959, filed Apr. 19, 2023, now U.S. Pat. No. 11,962,463, which is a continuation of U.S. application Ser. No. 16/920,215, filed Jul. 2, 2020, now U.S. Pat. No. 11,677,625 B2, which claims the benefit of U.S. Provisional Application No. 62/869,960, filed on Jul. 2, 2019. The entire teachings of the above applications are incorporated herein by reference.

GOVERNMENT SUPPORT

This invention was made with government support under Grant No. HR0011-17-C-0050 from DARPA and Grant No. NeTS-1718355 awarded by the National Science Foundation. The government has certain rights in the invention.

BACKGROUND

Centralized clouds have dominated IT service delivery over the past decade. Operating over the Internet, the clouds' low cost of operation has made them the primary means of achieving energy efficiency and computation speed-up for resource-poor devices. Recently, the cost efficiency and scalability of a centralized cloud have been challenged by an emergence of Internet of Things (IOT) devices and an associated increase in services with ultra-low latency requirements (one millisecond or less). This has made paradigms such as fog computing and mobile edge computing more appealing. A family of such paradigms is hereinafter referred to as dispersed computing.

In the fog computing paradigm, networking, computation, and storage resources are distributed at different hierarchical levels from the core of a network to the edge. In mobile edge computing, these resources are distributed throughout the mobile edge close to the users. As the number of delay-sensitive applications increases, these platforms have the potential to outperform centralized cloud architectures in terms of request satisfaction delay. The potential benefits of such paradigms are accompanied by challenges in distributed implementation and control. Another challenge is an increased popularity of media-rich and data-driven applications, where computations are often designed to be performed on large pieces of data stored in the network. Medical data analytics, data processing for wearable devices, intelligent driving and transportation systems, and in-network image/video processing are examples of such applications.

A fundamental question in dispersed computing is how to optimally utilize processing, storage, and bandwidth resources in a network to accomplish data-centric computation with high throughput and low latency. Specifically, how should one forward computation requests, perform computations, and move and store data in the network? For instance, should one bring data to the computation-requesting node for computation or take the computation to the data server? How can one provide a solution in a distributed and adaptive manner within networks with general topology and request patterns? Adaptive, in this sense, means that computer-implemented control methods do not require knowledge of computation request rates.

SUMMARY

While previous work has addressed aspects of the fundamental question raised above, the problem has never been solved as a coherent whole. Specifically, the computing field lacks an optimized framework for joint computation, caching, and request forwarding in data-centric computing-based networks. Methods and systems of the present invention provide a framework for joint computation, caching, and request forwarding based on a throughput optimal policy for servicing computation requests received from one or more entities. The framework provides superior performance in terms of request satisfaction delay as compared with several baseline policies over multiple network topologies.

In some embodiments, a computing-based network for servicing computation requests received from one or more entities includes a given network node configured to update a local joint policy defining rules to govern calculations used to make decisions to perform computations at the given network node to service computation requests. An act of servicing computation requests is referred to interchangeably herein as serving computation requests. The given network node may be further configured to exchange computation request counters and data request counters with neighboring network nodes to enable the given network node to update the local joint policy to define rules to govern calculations used to make decisions to forward computation requests or representations thereof or data requests for at least a portion of a data object required for performing the computations, the requests being forwarded from the given network node, to service the computation requests. The given network node may be further configured to update the local joint policy to define rules to govern calculations used to make decisions to cache at least a portion of the data objects at the given network node to service a next computation request more quickly. The computing-based network may further include neighboring network nodes configured to update respective joint policies local to the neighboring network nodes to govern calculations used to make decisions to perform computations at the neighboring network nodes to service the computation requests. The neighboring network nodes may be further configured to exchange computation request counters and data request counters with the given network node to enable the neighboring network nodes to update the respective joint policies to define rules to govern calculations used to make decisions to forward computation requests or representations thereof or data requests for at least a portion of a data object required for performing the computations, the requests being forwarded from the neighboring network nodes, to service the computation requests. The neighboring network nodes may be further configured to update the respective joint policies to define rules to govern calculations used to make decisions to cache at least a portion of a data object at the neighboring network nodes to service a next computation request more quickly. The act of servicing a computation request may include nodes of the computing-based network forwarding a result of computations performed on at least one data object in a direction opposite the direction in which the computation request was forwarded, along the same path on which the computation request was forwarded.

It should be noted that an act of performing calculations is herein distinct from an act of performing computations. Calculations refer to a process supporting a making of decisions regarding performing computations, forwarding computation requests or data requests, and caching data. Computations refer to a process of fulfilling a computation request using data of a data object. A representation of a computation request may include a computation interest packet. A representation of a data request, or a representation of a data object, may include a data interest packet.

In some embodiments, individual nodes include a module configured to perform functions of a virtual plane and an actual plane. The functions of the virtual plane may include the self-determination of the local joint policy. The functions of the actual plane may include performing computations according to the local joint policy. The functions of the actual plane may include forwarding the computation request or a representation thereof or at least a portion of a data object or a representation thereof to neighboring nodes according to the local joint policy. The functions of the actual plane may include caching the at least a portion of the at least one data object or representation thereof according to the local joint policy.

In some embodiments, the self-determination of the local joint policy includes the individual nodes updating the local joint policy by calculating a difference between respective computation request counters for computation requests of one or more queues at the individual nodes and respective data request counters for the computation requests of the one or more queues, and further includes the individual nodes servicing a computation request having a maximum difference.

In some embodiments, the self-determination of the local joint policy includes the individual nodes updating the local joint policy by calculating respective normalized maximum computation request backlogs and respective normalized maximum data request backlogs for computation requests of one or more queues at the individual nodes, and further includes the individual nodes determining a maximum among the respective normalized maximum computation request backlogs and the respective normalized maximum data request backlogs to identify a computation request or a representation thereof or a data request for at least part of a data object to forward to neighboring nodes. The backlogs may be differences between counters of the individual nodes and corresponding counters of neighboring nodes. The individual nodes may be configured to forward the identified computation request or representation thereof or data request for at least part of a data object to neighboring network nodes.

In some embodiments, the self-determination of the local joint policy includes the individual nodes updating the local joint policy by calculating a maximum possible total cache score for data objects in caches at the individual nodes given data objects in the caches at the time of the self-determination and data objects otherwise available at the time of the self-determination at respective individual nodes. The individual nodes may be configured to cache data objects to achieve the calculated maximum possible total cache score at the individual nodes.

In some embodiments, the cache score of a data object is a time-average of the number of times the data object is received at the respective individual nodes or used in performing a computation to service a computation request at the respective individual nodes.

An act of caching may include removing data objects presently stored in a cache from the cache to make room in the cache for at least one new data object to be stored. An act of caching may include retaining data objects presently stored in a cache.

In some embodiments, the computing-based network may include respective processors and non-transitory computer-readable media located at the given network node and the neighboring network nodes, the computer-readable media having processor instructions stored thereon, the respective processors configured to load and execute the instructions that, when executed, cause the given network node and the respective neighboring network nodes to service computation requests according to the respective joint policies local to the given network node and the respective neighboring network nodes in a distributed network manner.

It should be understood that the various embodiments and features described above in reference to the given network node and elements therewith may similarly be applied to the neighboring network node embodiments.

In some embodiments, a node of a computing-based network for servicing one or more computation requests received from one or more entities includes a processor and a non-transitory computer-readable medium having processor instructions stored thereon. The processor may be configured to load and execute the instructions. The instructions, when executed, may cause the node to track one or more local computation request counters and one or more local data request counters. The instructions, when executed, may further cause the node to indicate the local computation request counters and the local data request counters to neighboring nodes. The instructions, when executed, may further cause the node to make a self-determination of a local joint policy for performing computations, for forwarding at least one computation request or a representation thereof or at least a portion of at least one data object or a representation thereof, and for caching the at least a portion of the at least one data object or representation thereof. The self-determination may calculate the local joint policy as a function of a local computation request counter and computation request counters of respective neighboring nodes. The self-determination may calculate the local joint capacity as a function of local and neighboring data request counters. The processor may be further configured to cause the node to perform computations to service the one or more computation requests using data of the at least one data object, and to forward results of the computations toward the entities that submitted the respective computation requests.

In some embodiments, a method of servicing one or more computation requests received from one or more entities by a node of a computing-based network includes tracking one or more local computation request counters and one or more local data request counters. The method may further include indicating the local computation request counters and the local data request counters to neighboring nodes. The method may further include making a self-determination of a local joint policy for performing computations, for forwarding the at least one computation request or a representation thereof or at least a portion of at least one data object or a representation thereof, and for caching the at least a portion of the at least one data object or representation thereof. The self-determination may calculate the local joint policy as a function of a local computation request counter and computation request counters of respective neighboring nodes. The self-determination may calculate the local joint policy as a function of local and neighboring data request counters. The method may further include performing computations to service the one or more computation requests using data of the at least one data object, and forwarding results of the computations toward the entities that submitted the respective computation requests.

It should be understood that the various embodiments and features described above in reference to the computing-based network and elements therein may similarly be applied to the node, method, and computer-readable medium embodiments.

BRIEF DESCRIPTION OF THE DRAWINGS

The foregoing will be apparent from the following more particular description of example embodiments, as illus

FIG. 2I is a diagram illustrating an embodiment of the computing-based network of FIG. 2H upon caching of a data object.

DETAILED DESCRIPTION

Figure 1A:
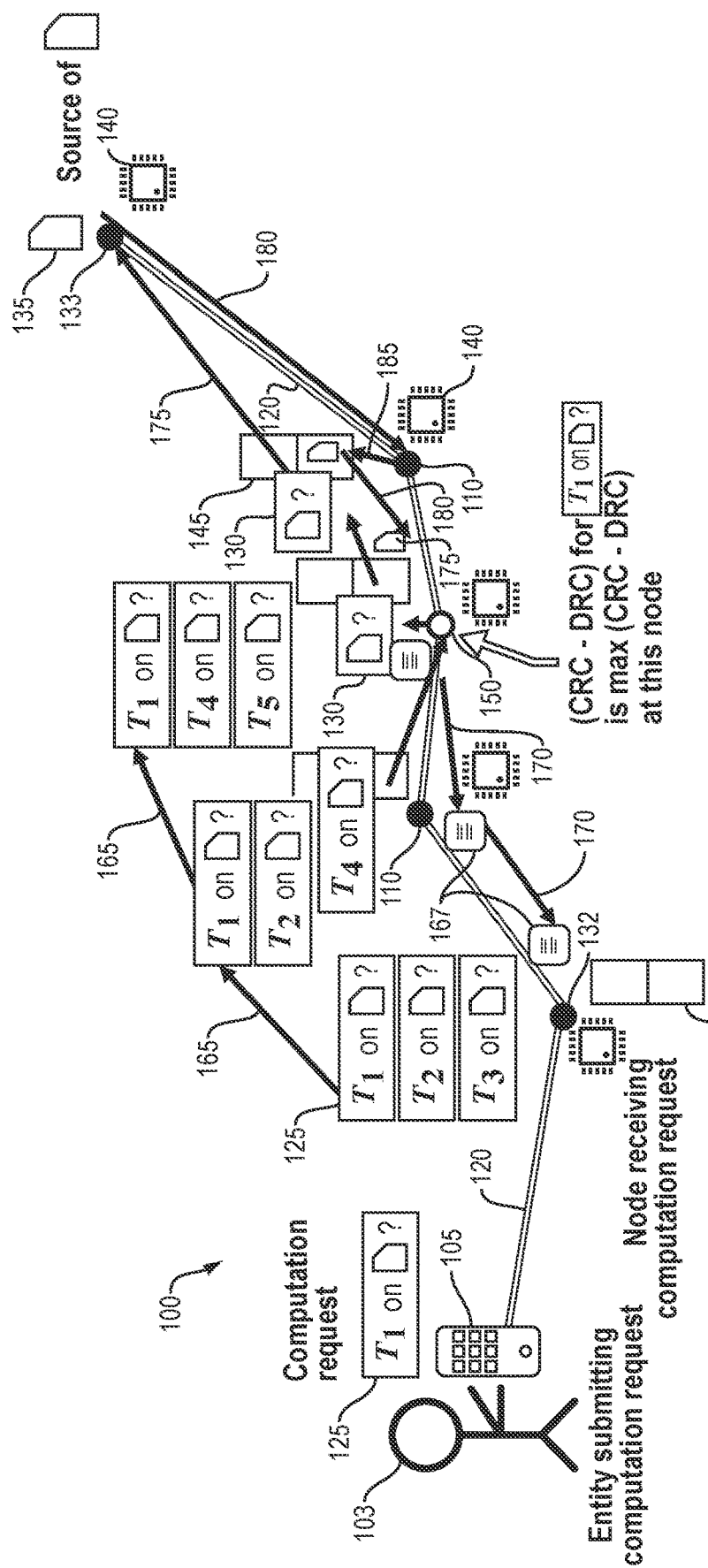
- FIG. 1A is a diagram illustrating forwarding, caching, and computing by nodes along a path in a computing-based network.

A description of example embodiments follows.

The teachings of all patents, published applications and references cited herein are incorporated by reference in their entirety.

The systems and methods described below provide an efficient framework for joint computation, caching, and forwarding in data-centric dispersed computing-based networks with arbitrary topology and arbitrary processing, communication, and storage resources available at each computing node. An entity may issue a computation request for performing a computation task on a data object (e.g., processing a 3D map of the environment in augmented reality/virtual reality (AR/VR) applications.) This computation request, which may be accompanied by one or more input arguments (e.g., the feature map of users' point of view in AR/VR applications), may be forwarded through the network until a node decides to perform the task locally. This node can process the computation only when it has the required data object, either from its own cache or fetched from another node by issuing a data request. After the data request arrives at a data server or caching point, a copy of the data may be sent back to the data requester on the reverse path of the data request. Each node on the path can optionally cache the data for future use. The data requester then processes the task and sends the result back to the original computation requester on the reverse path of the computation request. The question is how nodes should decide on computation request forwarding, data request forwarding, computation and caching in an adaptive and distributed manner.

The data-centric computation (DECO) framework described herein solves this challenging problem utilizing two metrics, referenced herein as a computation request counter (CRC) and data request counter (DRC), to capture the measured demand for computations and data objects, respectively. Virtual request counters as a metric for measured demand were previously introduced for caching networks where a virtual plane was employed to handle the virtual interests (see Yeh, E., et al., "VIP: A Framework for Joint Dynamic Forwarding and Caching in Named Data Networks," in *Proceedings of the 1st ACM Conference on Information-Centric Networking (ACM-ICN '14)*, ACM, pages 117-126, September, 2014). Similarly, here a virtual plane operates on the CRCs and DRCs, and an actual plane handles actual computation requests, data requests, data objects and computation results in the physical network. This separation between the virtual and actual planes allows for designing the elegant DECO joint computation/caching/forwarding computer-implemented method. The DECO computer-implemented method ("DECO method") is throughput optimal in the virtual plane, and is used in the actual plane to decide on forwarding, computation and caching actions in the network. The superior performance of the DECO method, relative to many baseline methods, is shown through extensive simulation studies.

Task scheduling and resource allocation in a heterogeneous computing platform have been studied in research and practice. Topcuoglu et al. studied the problem of static task scheduling and proposed a centralized heuristic called Heterogeneous Earliest-Finish-Time (HEFT) for scheduling tasks represented by a Directed Acyclic Graph (DAG) (see Topcuoglu, H., et al., "Performance-effective and low-complexity task scheduling for heterogeneous computing," in *IEEE Transactions on Parallel and Distributed Systems* 13, 3, pages 260-274, March 2002. Pegasus and Centralized Runtime Scheduler (CIRCE) were proposed as frameworks for mapping of tasks to computers in a dispersed computing system (sec Declman, E., et al., "Pegasus: Mapping Scientific Workflows onto the Grid," in *Grid Computing*, Marios D. Dikaiakos (Ed.). Springer Berlin Heidelberg, Berlin, Heidelberg, pages 11-20, 2004, and Knezevic, A. et al., "CIRCE—a Runtime Scheduler for DAG-based Dispersed Computing: Demo," in *Proceedings of the Second ACM/IEEE Symposium on Edge Computing*, ACM, New York, NY, USA, Article 31, 2 pages, 2017). Distributed assignment of tasks to computers was studied (see Knezevic, A. et al., "WAVE: A Distributed Scheduling Framework for Dispersed Computing," in *USC ANRG Technical Report*, 2018). These works present frameworks for the task assignment problem but do not provide any optimality guarantee on the performance of the computing network.

The problem of virtual function placement in a computing network, where the objective is to minimize the cost of setting up functions and requesting service, was studied by Cohen et al. (sec Cohen, R., et al., "Near optimal placement of virtual network functions," in 2015 *IEEE Conference on Computer Communications (INFOCOM)*, pages 1346-1354, April, 2015). Feng et al. studied a similar problem in a distributed cloud network where computation services are modeled as a chain of consecutive tasks, and there is a linear cost associated with setting up and utilizing computation and communication resources. They propose a throughput optimal method for task scheduling and request forwarding based on minimization of Lyapunov drift plus penalty to minimize the cost while keeping the computation queues stable (see Feng, H., et al., "Optimal Dynamic Cloud Network Control," in *IEEE/ACM Transactions on Networking*, pages 1-14, 2018). A throughput optimal policy for uni-cast and multi-cast flows was proposed by Zhang et al. based on a layered graph model (see Zhang, J. et al., "Optimal Control of Distributed Computing Networks with Mixed-Cast Traffic Flows," in *IEEE INFOCOM* 2018—*IEEE Conference on Computer Communications*, pages 1880-1888, April, 2018). A throughput optimal policy for more general DAG-based service models was proposed by Yang, et. al. (see Yang, C. et al., "Communication-Aware Scheduling of Serial Tasks for Dispersed Computing," CoRR abs/1804.06468, arXiv: 1804.06468, 2018).

Although these methods stabilize the computation queues, in a data-centric computing network, the solution should also take stabilization of data queues into account. Chen et al. proposed a solution to joint caching and computation at the mobile edge where caching is used to store the final result of computations (sec Chen, M. et al., "Edge-CoCaCo: Toward Joint Optimization of Computation, Caching, and Communication on Edge Cloud," in *IEEE Wireless Communications*, 25, 3, pages 21-27, June, 2018). Similarly, Zeng et al. studied the problem of task scheduling and image placement in order to minimize the request satisfaction delay (sec Zeng, D., et al., "Joint Optimization of Task Scheduling and Image Placement in Fog Computing Supported Software-Defined Embedded System," in *IEEE Transactions on Computers*, 65, 12, pages 3702-3712, December, 2016). In contrast to the present invention, the works described above study specific one-hop and two-hop topologies in a centralized fashion, where request rates are known a priori.

In some embodiments of the present invention, in a network of computing nodes, the nodes are capable of processing computation tasks, caching data objects and communicating with other computing nodes in the network. The network can be modeled as a directed graph $\mathcal{G}(\mathcal{V},\mathcal{E})$ with $\mathcal{V}$ and $\mathcal{E}$ representing network nodes and links, respectively. It may be assumed that $(b,a) \in \mathcal{E}$ whenever $(a,b) \in \mathcal{E}$. Each node $v \in \mathcal{V}$ may be equipped with a processor with capacity of $P_v$ (in instructions per second). Each node $v \in \mathcal{V}$ may be equipped with a cache with capacity of $C_v$ (in bits). The transmission capacity on link $(a,b) \in \mathcal{E}$ may be $C_{ab}$ (in bits per second). There may be a set $\mathcal{F}$ of tasks which all nodes are capable of processing. These computation tasks may operate on a set $\mathcal{D}$ of data objects, each stored somewhere in the network. An entity may issue a computation request from the set of available requests $\mathcal{R} \subseteq \mathcal{F} \times \mathcal{D}$. Each request for performing the mth task on the kth data object may be associated with unique user-specified inputs with negligible size compared to the required data object k. It may be assumed that computation load and size of the results are determined by the computation task m and the data object k, and not by the user specified inputs. Thus, a computation request may be specified by a pair $(m,k) \in \mathcal{R}$. It may be assumed that the size of the kth data object is $L_k$ (in bits) and the size of the result of the mth task on the kth data object is $Z_{(m,k)}$ (in bits). The computation load of performing the mth task on the kth data object may be denoted by $q_{(m,k)}$ (in number of instructions). It may be assumed that for each data object $k \in \mathcal{D}$ there is a designated node denoted by $src(k) \in \mathcal{V}$ that serves as the permanent source of the data object, herein referred to as the source node. This setting can be extended to a scenario where there are multiple designated source nodes for each data object. At the source nodes, the cache space may be additional to the storage space needed for permanently stored data objects. Since requests of type (m,k) require data object k for processing, src(k) can always process such computation requests and, therefore, can serve as a computing node for these requests.

It may be assumed that routing information to the source nodes is already populated in every node. (Routing and forwarding, as described herein, are two different procedures. Routing is a network-wide process that provides possible forwarding interfaces toward the destination at each node, and forwarding is the action of transferring requests or data objects, or representations thereof, to an appropriate output interface.) Requests of type (m,k) may arrive at node $n \in \mathcal{V}$ according to a stationary and ergodic process $A_n^{(m,k)}(t)$ with average arrival rate $$\lambda_n^{(m,k)} \triangleq \lim_{t \to \infty} \frac{1}{t} \sum_{\tau=1}^{t} A_n^{(m,k)}(\tau).$$

A node receiving a computation request may generate a computation interest packet with negligible size (compared to the data objects' and the computation results' respective sizes) containing the task identification (m), data identification (k), and any input arguments to be forwarded through the network. Nodes receiving a computation interest packet may decide whether or not to perform the computation request locally.

Performing computation requests, and processing computation requests, as described herein, are distinct but related terms. A procedure for performing a computation request at node n may include, if data object k is stored at node n, sending the computation request to a queue at the processor for processing; otherwise, if data object k is not stored at node n, the procedure may include putting the computation request in a separate queue PCR(k) at the processor for pending computation requests for data object k, and issuing a request for fetching data object k by creating a data interest packet. The procedure may further include, if data object k arrives at node n, moving the pending computation requests from the PCR(k) queue into the queue for processing in first-come-first-served order.

If the node does not decide to perform the computation locally, it can forward the computation interest packets to its neighbors. The receiving neighbor may remember the interface on which it receives the interest packet. The node which processes the computation request may put the result into a result packet and send the result packet back on the reverse path (of the computation interest packet) to the original requester.

A node may issue a data interest packet when it decides to perform a task but does not have the required data object stored locally. As in the case for computation interest packets, nodes receiving data interest packets may remember the incoming interface. When a node receives a data interest packet for a data object in its cache, the node may create a copy of that data object, put it into a data packet, and send the data object back on the reverse path (of the data interest packet) to the requester. Nodes receiving data objects on the reverse path have the option to cache them for future use.

FIG. 1A depicts a part of a computing-based network 100 coupled with a user 103 who is accessing the network 100 through use of an entity 105. The network 100 includes nodes 110. A path 120 develops through the nodes 110 responsive to a computation request 125 submitted by the entity 105. In some embodiments, the entity 105 may be multiple entities. In some embodiments, the computation request 125 may be multiple computation requests. In some embodiments, multiple paths 120 may develop pursuant to a computation request 125, as a node 110 determines an appropriate output interface through which to send the computation request 125. The computation request 125 is of type (m,k), where m represents a task $T_1$ to be performed and k represents a data object 135 needed for the task $T_1$, as described further below. The computation request 125, along with other computation requests for tasks $T_2$, $T_3$, etc. together make up a queue of computation requests at each node. A data request 130 is generated at a node 110 along the path 120. A first node along the path 120 is designated as the node receiving the computation request, or the receiving node 132. A last node along the path 120 is designated as a source node 133 of the data object 135. Smaller data structures, which may contain information regarding present link capacity and other dynamic network parameters, may travel along a path that differs from the path 120. The nodes 110 along the path 120 are equipped with one or more processors 140. The nodes 110 along the path 120 are equipped with one or more computer-readable media 145. The computer-readable media 145 may herein be alternatively referred to as a cache 145. A given node 150 decides to perform one or more computations to service the computation request 125. Servicing a computation request 125 is referred to interchangeably herein as serving a computation request 125. The nodes 110 forward 165 the computation request 125 along the path toward the given node 150. The given node 150 computes a result 167 of the computation request 125. The given node 150, followed by nodes remaining of the nodes 110 along the path 120, forwards 170 the result 167 toward the receiving node 132, in a direction opposite to the direction in which the computation request 125 was forwarded 165. The given node 150, followed by nodes remaining of the nodes 110 along the path 120, forwards 170 the result 167 toward the entity 105, in a direction opposite to the direction in which the computation request 125 was forwarded 165. The nodes 110 forward 175 the data request 130 along the path 120 toward the source node 133. The source node 133, followed by nodes remaining of the nodes 110 along the path 120, forwards 180 the data object 135 of type k toward the given node 150, in a direction opposite to the direction in which the data request 130 was forwarded 175. The nodes 110 cache 185 a data object as it is forwarded 180 toward the given node 150. It should be noted for clarity that cache 185 refers to an action of placing a data object 135 into a cache 145, where cache 145 is the non-transitory computer-readable medium present at the nodes 110.

In some embodiments, a computation request 125 may include a plurality of independent tasks, and the given node 150 may be configured to forward at least one task of the computation request 125 to neighboring nodes so that a neighboring node may service the at least one task of the computation request 125.

"Toward," as used herein, can suggest that a data object 135 or a result 167 may not make it to its original destination node, as the conditions of the network can be dynamically changing. The receiving node 132, the source node 133, and the given node 150 may be the same node, or they may be different nodes. Other nodes adjacent to neighboring nodes of the given node 150 may include the given node 150.

Figure 1B:
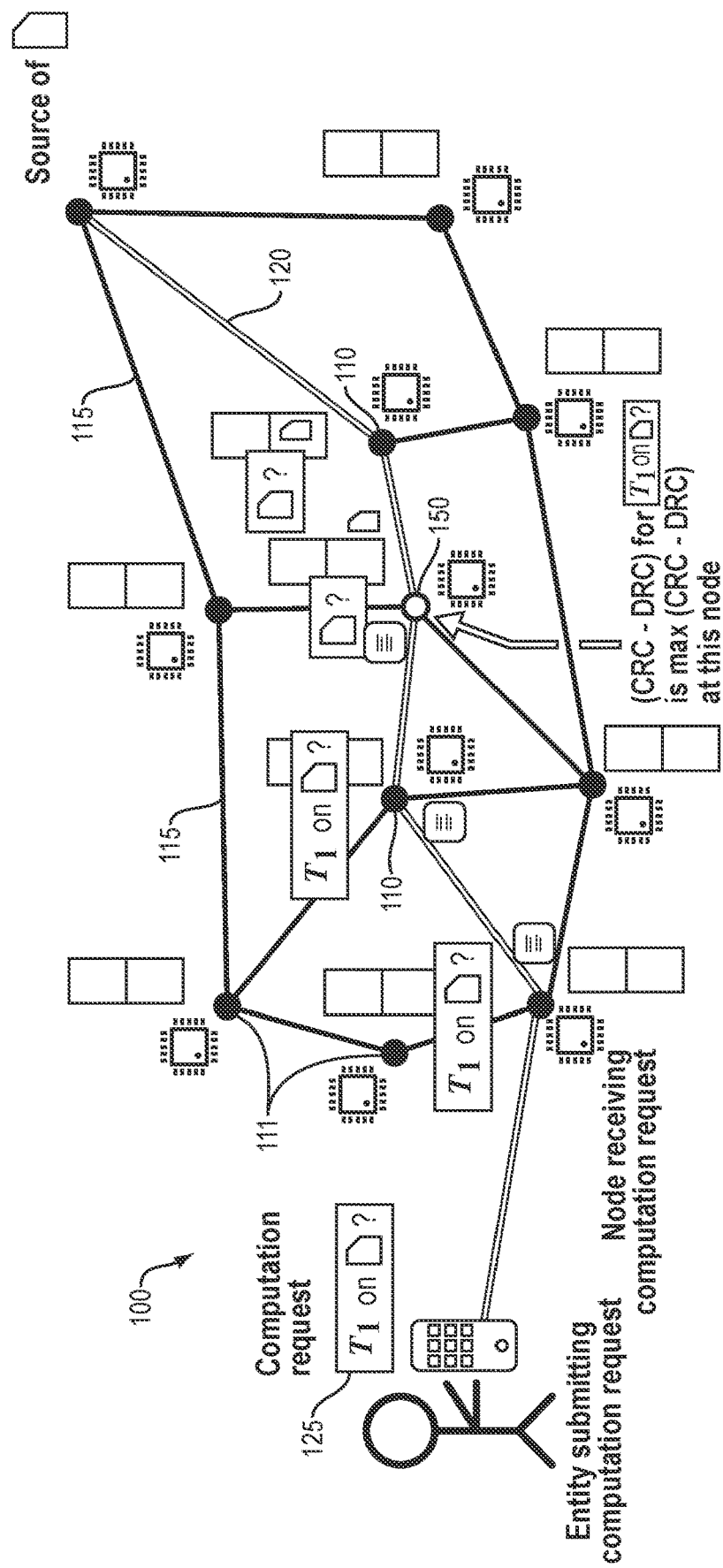
FIG. 1B is a diagram illustrating an embodiment of the computing-based network of FIG. 1A.

FIG. 1B depicts a more complete embodiment of the computing-based network 100 than FIG. 1A. Specifically, FIG. 1B shows nodes 111 not along the path 120 that do not become involved in servicing the computation request 125. Other computation requests for tasks $T_2$, $T_3$, etc. are omitted from FIG. 1B for clarity. FIG. 1B also shows links 115 between the nodes 111 not along the path 120 that do not carry requests, data, or results to service the computation request 125. The nodes 111 and links 115 not along the path 120 may become involved in servicing a different computation request, as computation requests requiring different tasks on different data objects necessarily give rise to different paths through the network. The given node 150 determines that the computation request 125 is presently the most favorable computation request to service, and performs computations to service the computation request 125.

FIGS. 2A-2J are network diagrams that illustrate a process in which a computation request is serviced by a given node in accordance with an embodiment of the distributed joint optimization method disclosed herein.

Figure 2A:
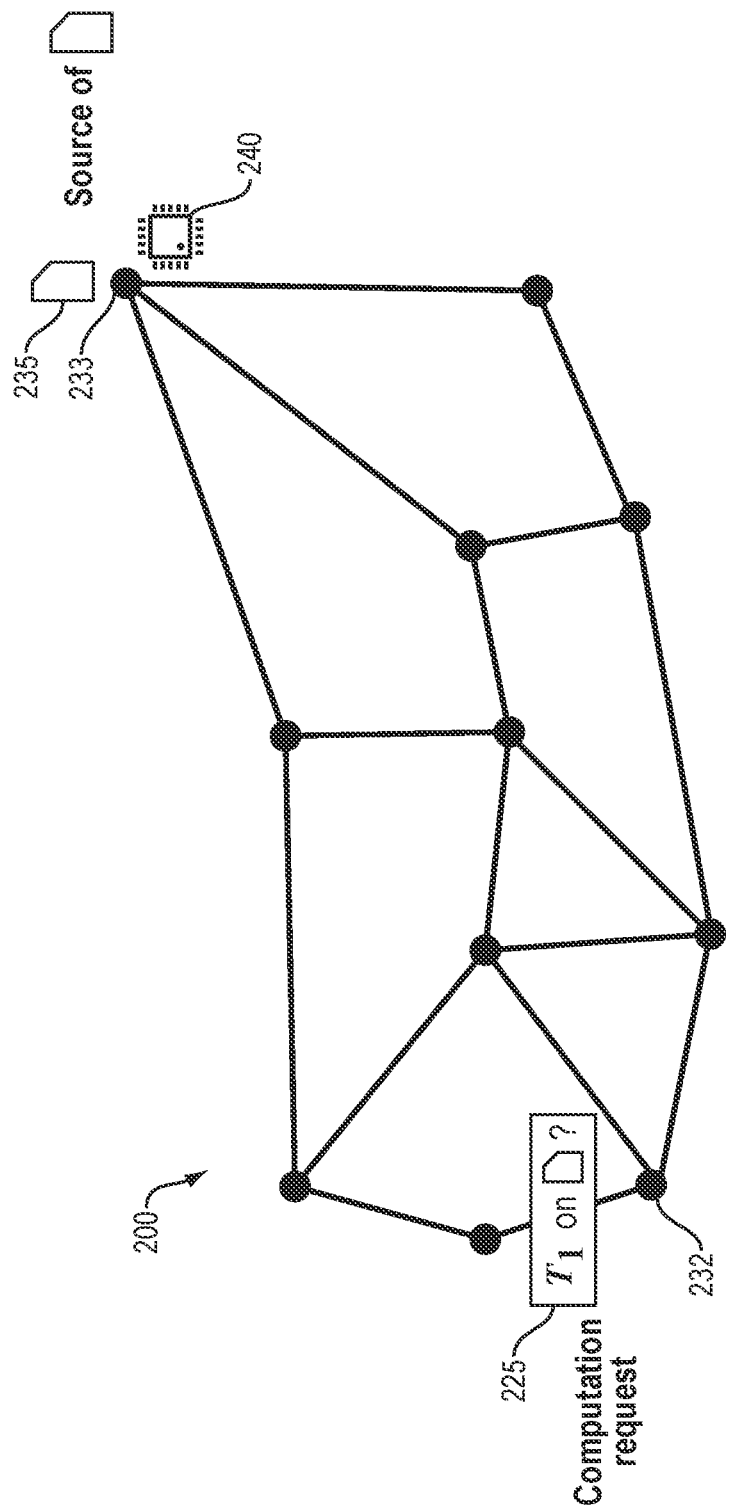
FIG. 2A is a diagram illustrating an embodiment of a computing-based network upon receipt of a computation request.

FIG. 2A shows an embodiment of a computing-based network 200. A computation request 225 may arrive at a receiving node 232. A source node 233 may have access to a data object 235. The source node 232 may be equipped with one or more processors 240.

Figure 2B:
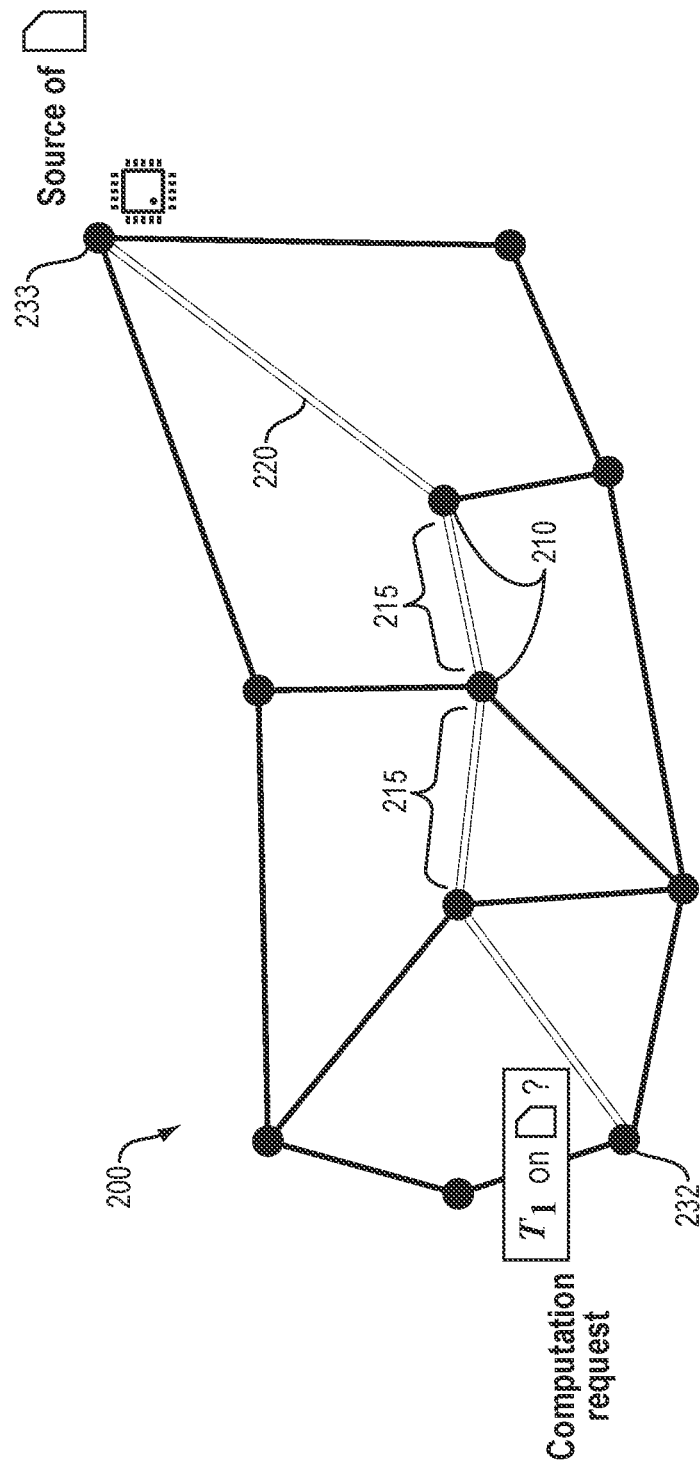
FIG. 2B is a diagram illustrating an embodiment of the computing-based network of FIG. 2A upon discovery of a data source.

FIG. 2B shows an embodiment of the computing-based network 200 in which nodes 210 and links 215 along a path 220 connect the receiving node 232 with the source node 233.

Figure 2C:
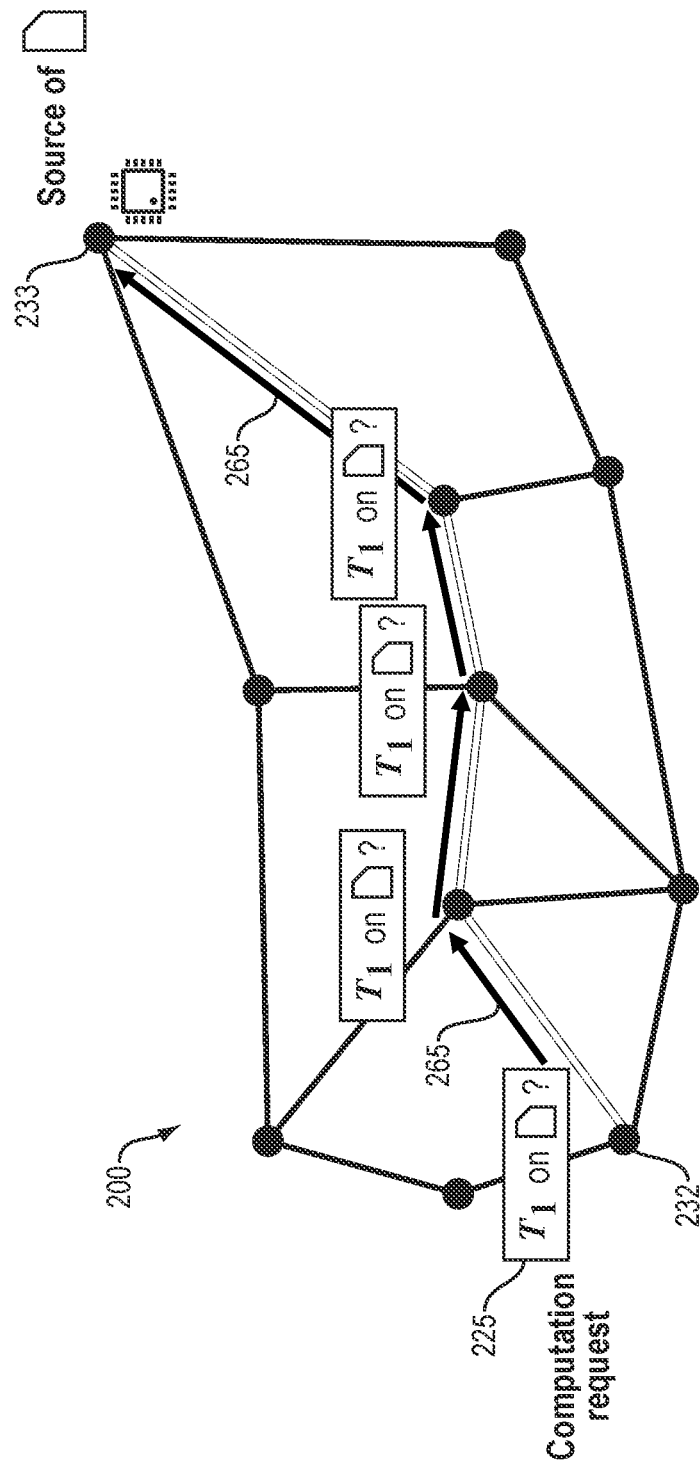
FIG. 2C is a diagram illustrating an embodiment of the computing-based network of FIG. 2B upon forwarding of a computation request.

FIG. 2C shows an embodiment of the computing-based network 200 in which the computation request 225 is forwarded 265 along the path 220 from the receiving node 232 toward the source node 233.

Figure 2D:
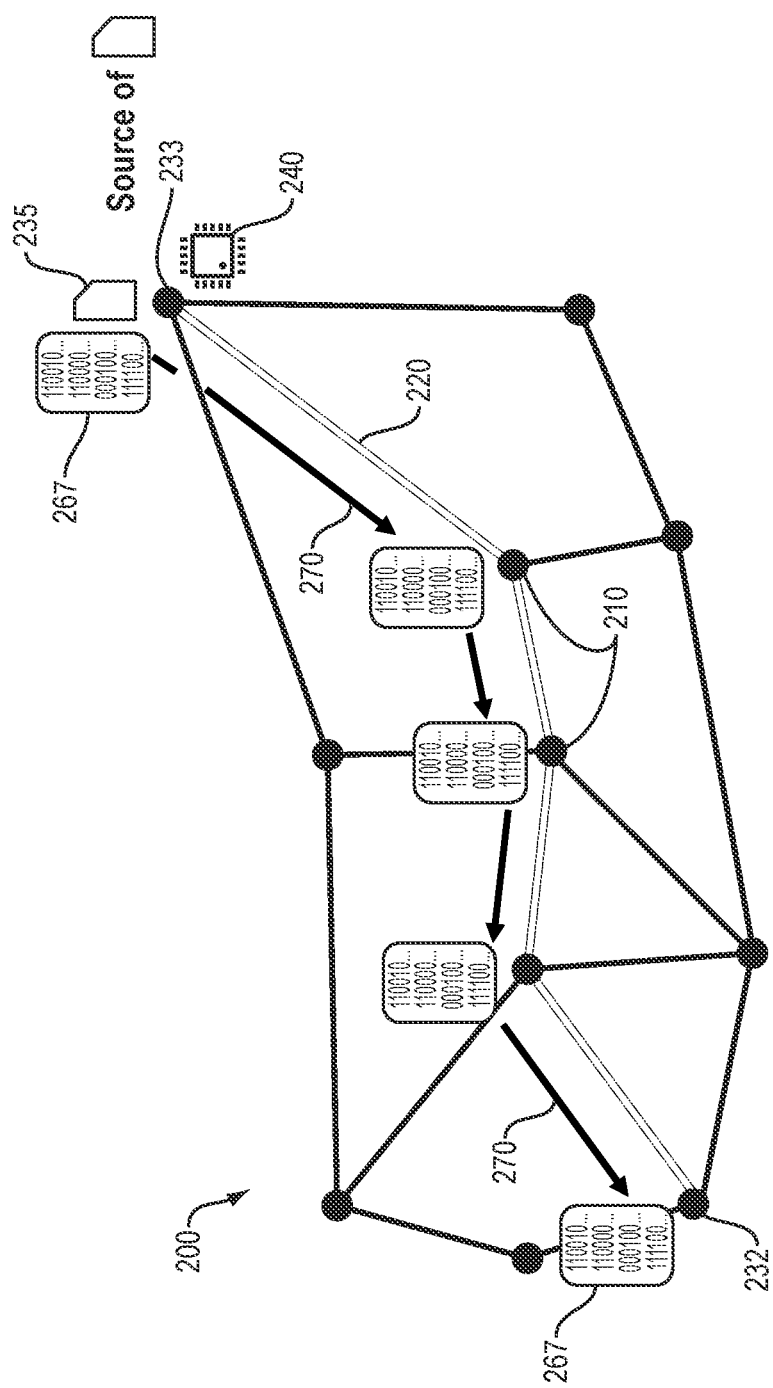
FIG. 2D is a diagram illustrating an embodiment of the computing-based network of FIG. 2C upon forwarding of a computation result.

FIG. 2D shows an embodiment of the computing-based network 200 in which the source node 233, with the data object 235 and the processor 240, computes a result 267 of the computation request 225 that was last shown in FIG. 2C. The source node 233, with the other nodes 210 along the path 220, forwards 270 the result 267 along the path 220 toward the receiving node 232 in a direction that is opposite to the direction in which the computation request 225 was forwarded 265.

Figure 2E:
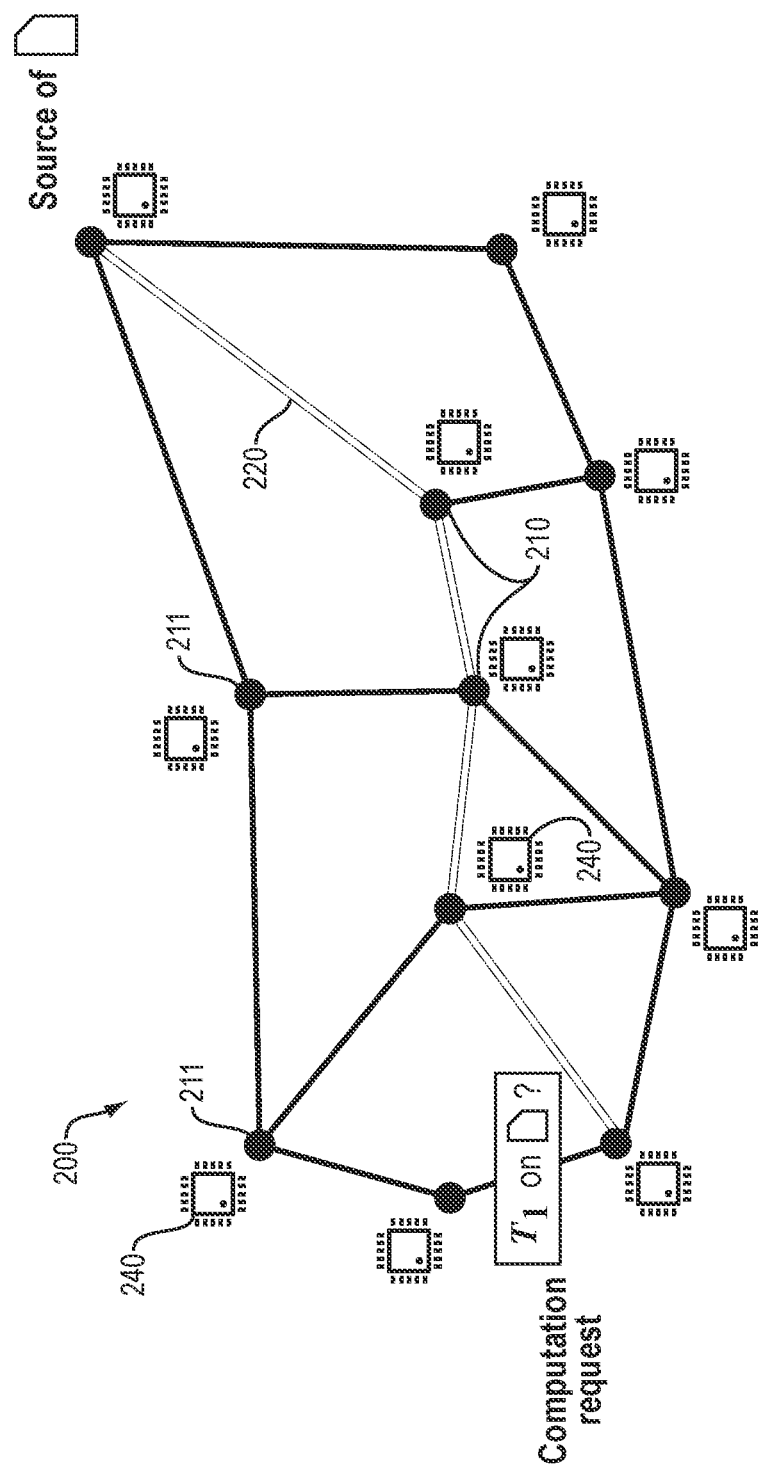
FIG. 2E is a diagram illustrating an embodiment of the computing-based network of FIG. 2B with a processor at each node.

FIG. 2E shows an embodiment of the computing-based network 200 in which nodes 210 along the path 220 and nodes 211 not along the path 220 are equipped with one or more processors 240. The processors 240 are provisioned to perform computer-implemented methods disclosed herein.

Figure 2F:
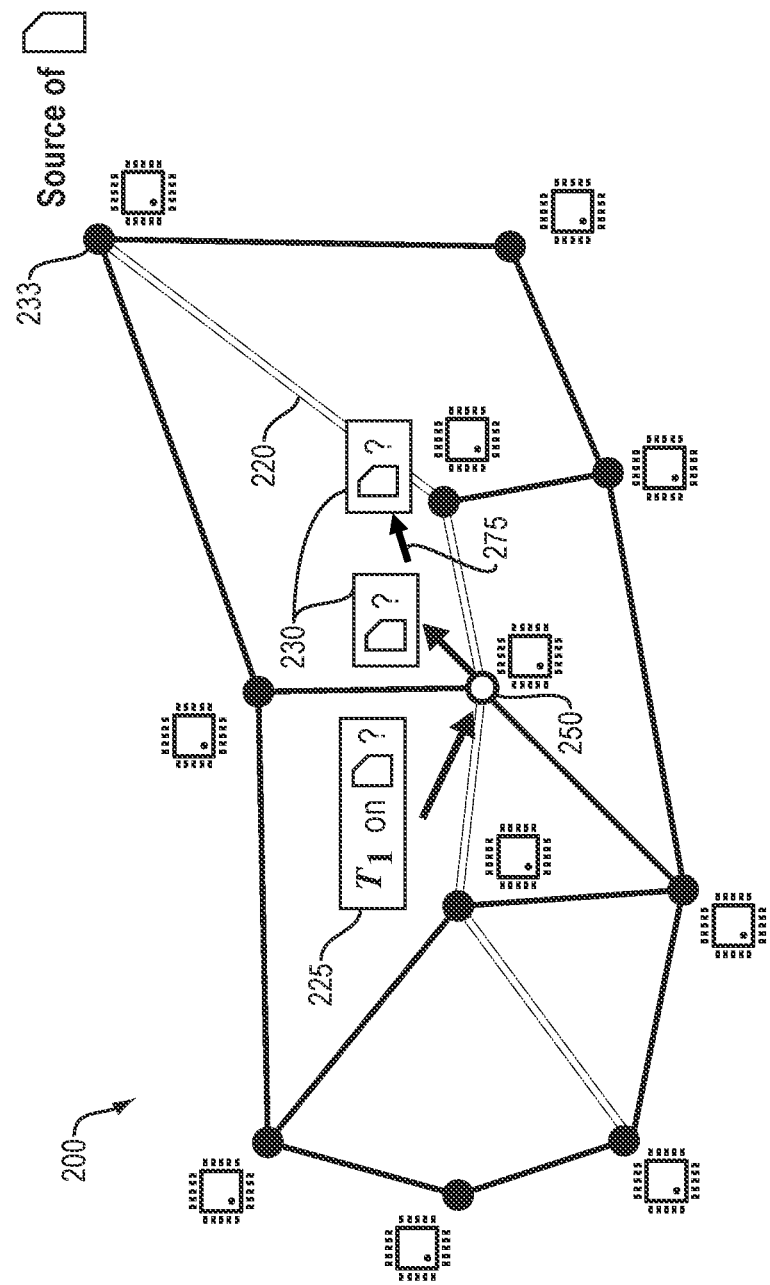
FIG. 2F is a diagram illustrating an embodiment of the computing-based network of FIG. 2E upon forwarding of a data request.

FIG. 2F shows an embodiment of the computing-based network 200 in which the given node 250 decides to perform one or more computations to service the computation request 225. In this embodiment, the given node 250 does not by itself have access to the data object 235. Thus, a data request 230 is issued by the given node 250 and forwarded 275 along the path 220 toward the source node 233.

Figure 2G:
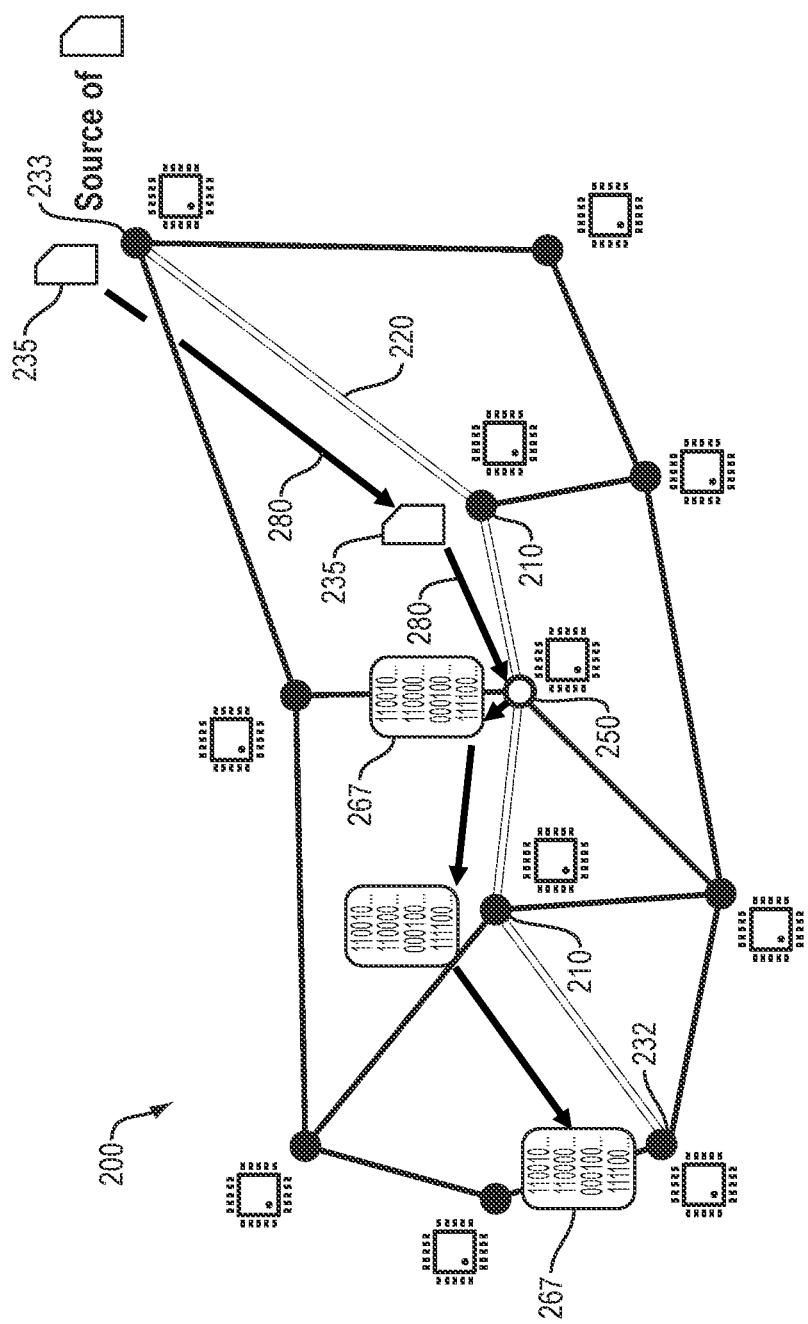
FIG. 2G is a diagram illustrating an embodiment of the computing-based network of FIG. 2F upon forwarding of a data object, performing of a computation, and forwarding of a result.

FIG. 2G shows an embodiment of the computing-based network 200 in which the source node 233 forwards 280 the data object 235 toward the given node 250 along the path 220. The given node 250 thus acquires access to the data object 235 for which it had issued a data request 230 in FIG. 2F. The given node 250, using the data object 235, computes a result 267 of the computation request 225 that was last shown in FIG. 2F. The given node 250, with the other nodes 210 along the path 220, forwards 270 the result 267 along the path 220 toward the receiving node 232.

Figure 2H:
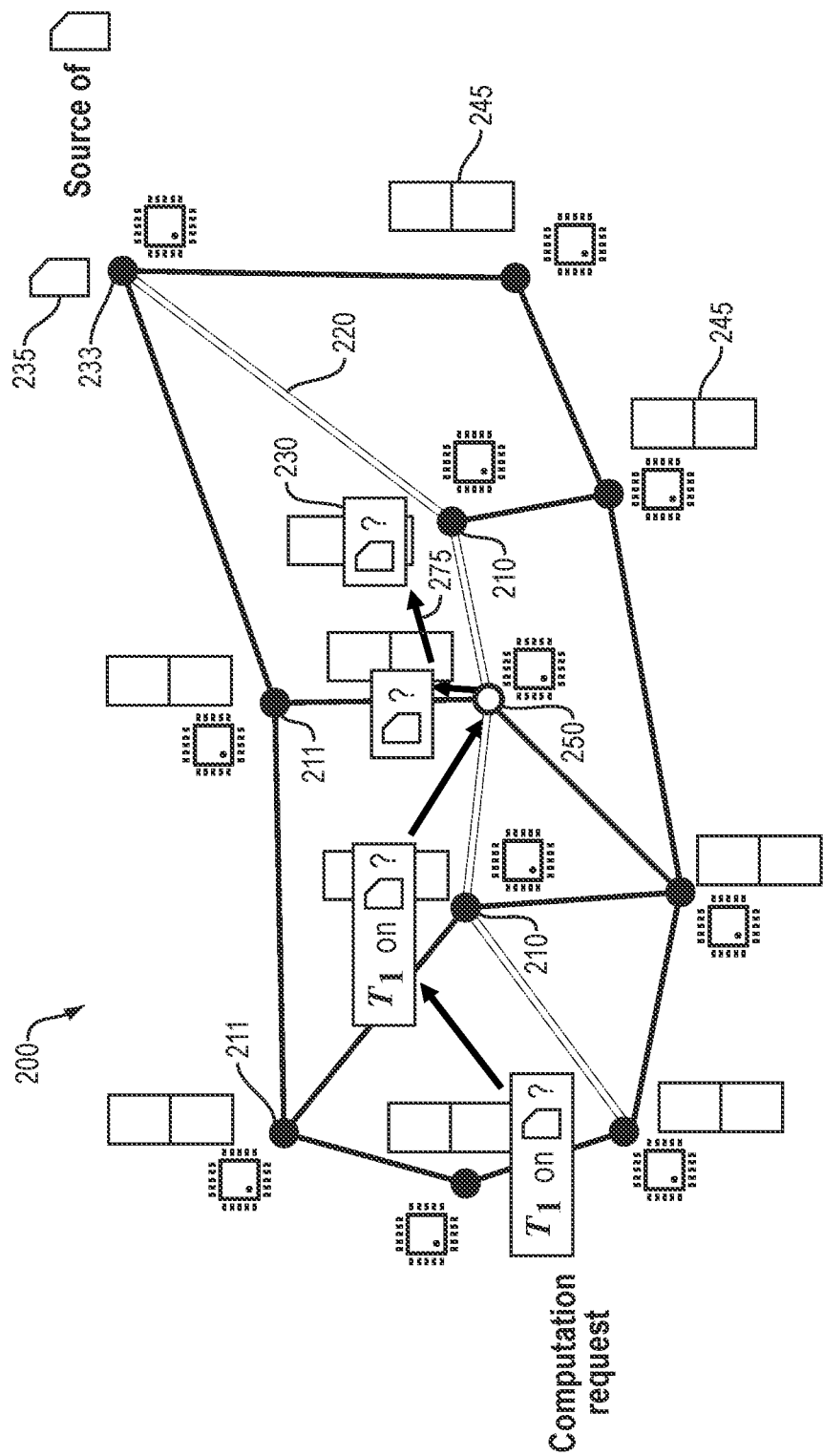
FIG. 2H is a diagram illustrating an embodiment of the computing-based network of 2E with a non-transitory computer-readable medium at each node.
Figure 21:
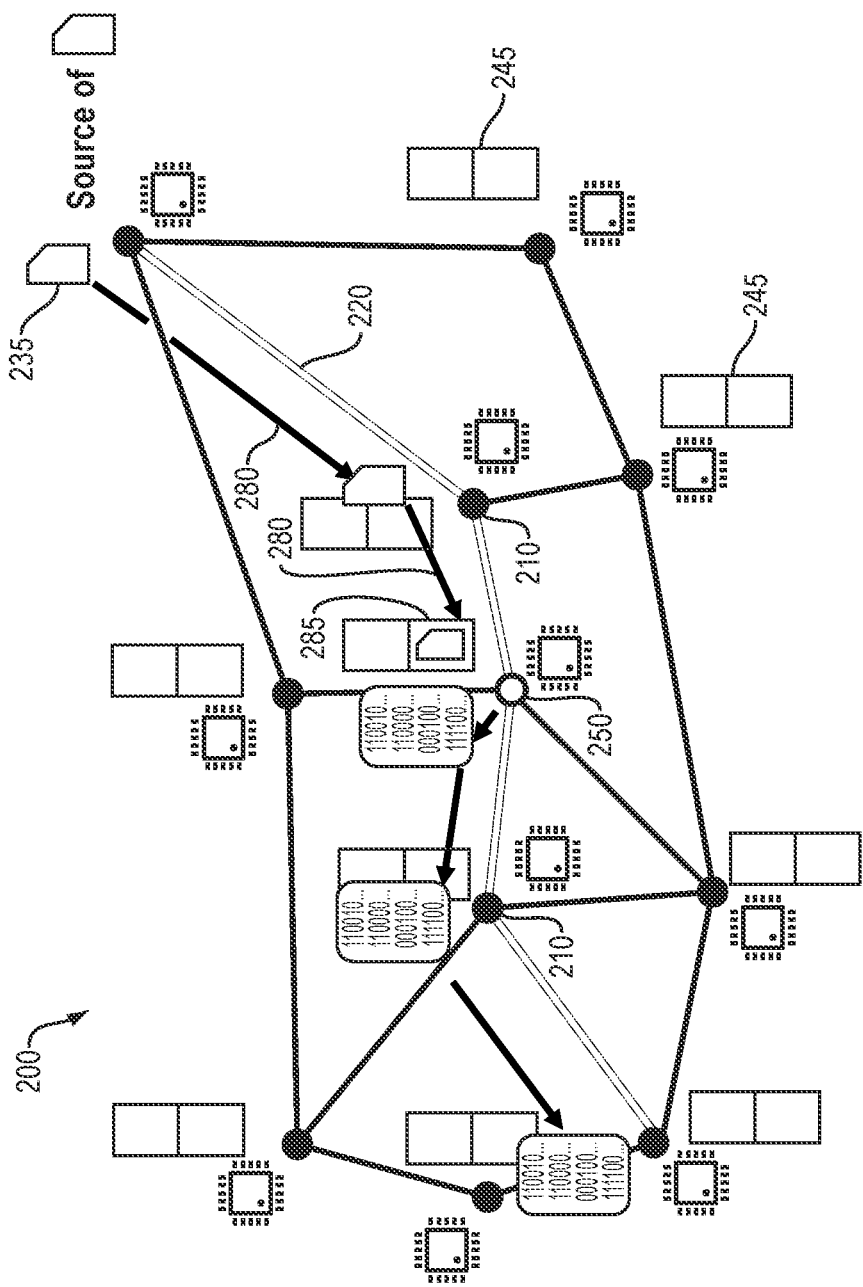

FIG. 2H shows an embodiment of the computing-based network 200 in which nodes 210 along the path 220 and nodes 211 not along the path 220 are equipped with one or more non-transitory computer-readable media 245. The computer-readable media 245 may herein be alternatively referred to as a cache 245. The presence of the cache 245 at the nodes 210 along the path 220 will allow the nodes 210 to store a copy of the data object 235 in the local cache 245. The data request 230 will thus not have to be forwarded 275 all the way to the source node 233, enabling the given node 250 to gain access to the data object 235 more quickly. The presence of the cache 245 at the nodes 211 not along the path 220 will allow caching to enable quick access to data objects by given nodes 250 that may be designated for different computation requests. The caching process described herein is further illustrated in FIG. 2I-2J as explained below.

FIG. 2I shows an embodiment of the computing-based network 200 in which nodes 210 along the path 220, which may include the given node 250, may cache 285 the data object 235 as it is forwarded 280 along the path toward the given node 250. With a copy of the data object 235 stored in a cache 245, the network 200 can potentially service a future computation request more quickly, if the future computation is to be performed at a node close to the node where the data object 235 is cached 285.

Figure 2J:
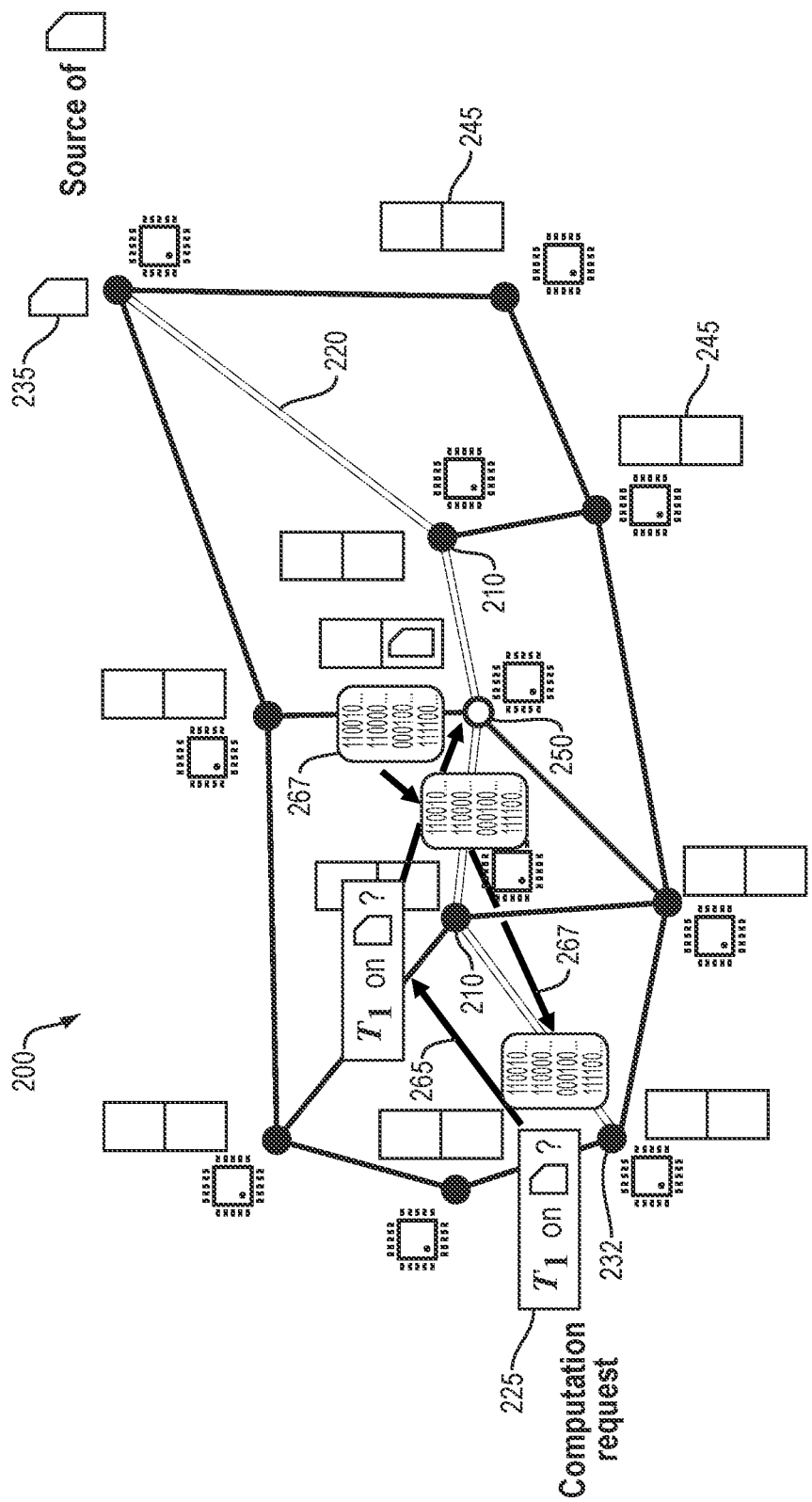
FIG. 2J is a diagram illustrating an embodiment of the computing-based network of FIG. 2H upon performing of a computation using a data object that had been previously cached.

FIG. 2J shows an embodiment of the computing-based network 200 in which the given node 250 computes a result 267 of the computation request 225 using the data object 235 received from its cache 245. The given node 250, with the other nodes 210 along the path 220, forwards the result 267 along the path 220 toward the receiving node 232 in a direction that is opposite to the direction in which the computation request 225 was forwarded 265. In this embodiment, the time taken by the network 200 to service the computation request 225 is significantly reduced by having a copy of the data object 235 for the computation request 225 already stored in the cache 245 at the given node 250.

There were several problems that needed to be solved in this setting, specifically, how to forward the computation and data interest packets, how to decide on performing computations and caching, and how to make these decisions in a distributed and scalable fashion. As mentioned above, the DECO framework for joint computation, forwarding, and caching, as described herein, solves these problems by utilizing computation request counters (CRCs) and data request counters (DRCs). CRCs and DRCs are virtual counts that may be tracked by each node and that may capture the measured demand for computations and data objects respectively. Specifically, the virtual counts for a computation or a data object in a given part of the network may represent the local level of interest in that computation or data object. The level of interest may be determined by network topology, users' demand and/or the capability of nodes in satisfying this demand through caches and processors.

Figure 3:
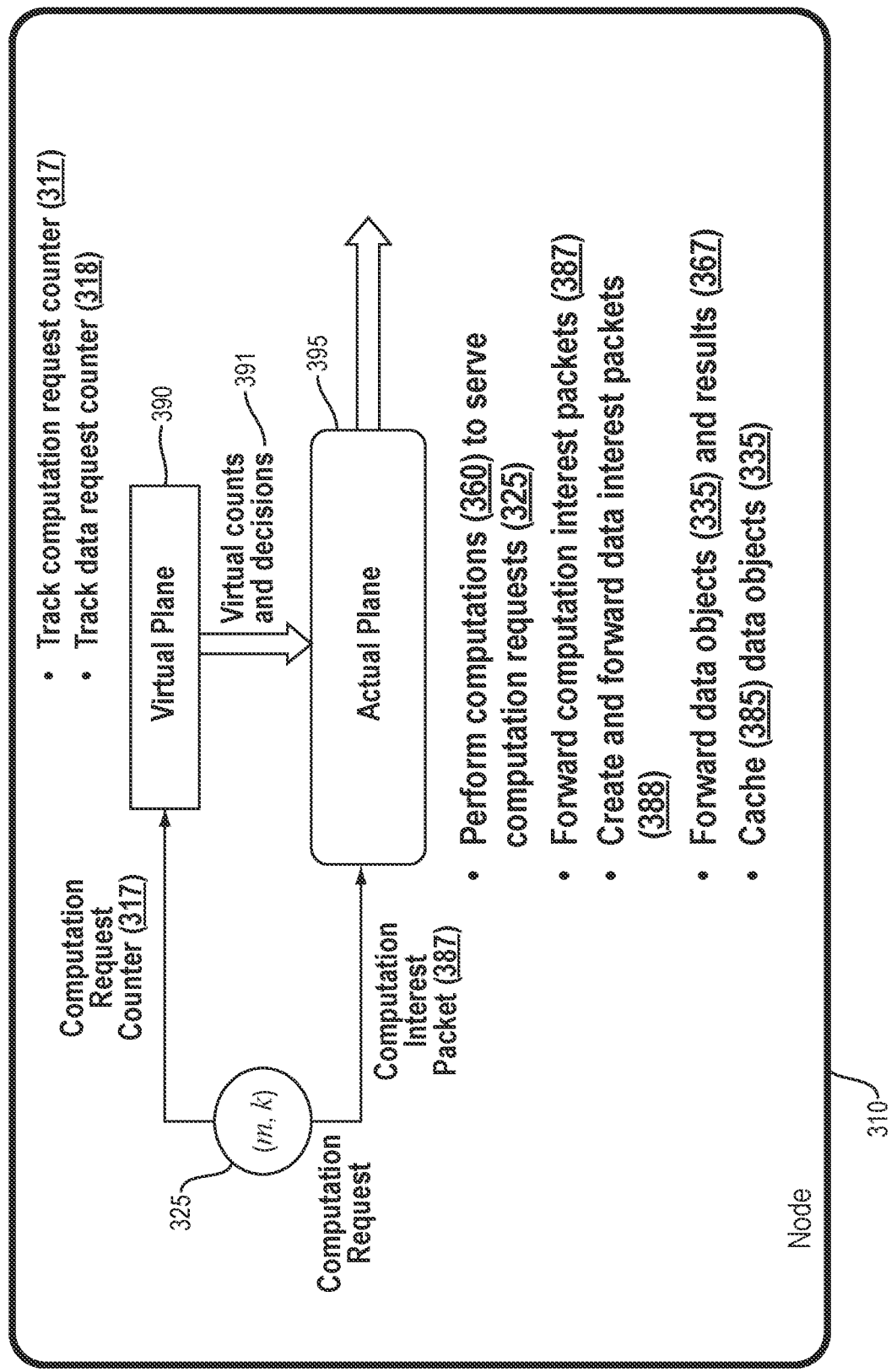
FIG. 3 is an annotated block diagram showing interaction of a computation request with a virtual and actual plane in a computing-based network.

FIG. 3 illustrates, for a node 310, that the CRCs 317 and DRCs 318, corresponding to a computation request 325, may be handled by a virtual plane 390. The virtual plane 390 may issue a communication in the form of virtual counts and decisions 391 to an actual plane 395. The actual plane 395 may be configured to perform computations 360 to service the computation request 325. The actual plane 395 may be further configured to handle forwarding of computation interest packets (CIPs) 387 and data interest packets (DIPs) 388. A representation of a computation request, as referred to herein, may be a CIP 387. The actual plane may be further configured to handle forwarding of data objects 335 and results 367. A horizontal rightward-pointing arrow shown to be emanating from the actual plane 395 on FIG. 3 represents results 367 being forwarded along the reverse path of the computation request 325. The actual plane may be further configured to handle caching 385 of data objects 335. This separation between the virtual 390 and actual 395 planes allows for designing the elegant DECO joint computation/caching/forwarding computer-implemented method. In the virtual plane 390, a throughput optimal policy is based on an assumption that any data object 335 can be accessed by any node 310 at any time. In the actual plane 395, a local joint policy for computing, forwarding, and caching is calculated by individual nodes 310 based on the throughput optimal policy of the virtual plane 390. The local joint policy is local in that it may apply to a single node 310. The local joint policy is joint in that it takes into account the CRCs 317 and DRCs 318 of neighboring nodes to inform decisions made by individual nodes 310 regarding forwarding of computation requests 325 and data objects 335. Respective joint policies local to neighboring nodes in turn inform decisions made by the neighboring nodes regarding computing, forwarding, and caching actions taken by the neighboring nodes. Joint policies may be established by provisioning processes of operations, administration, and management (OAM). The OAM processes may be carried out on network links with lower bandwidth than links used for servicing computation requests. More details regarding the local joint policy are presented in the paragraphs that follow.

Figure 4:
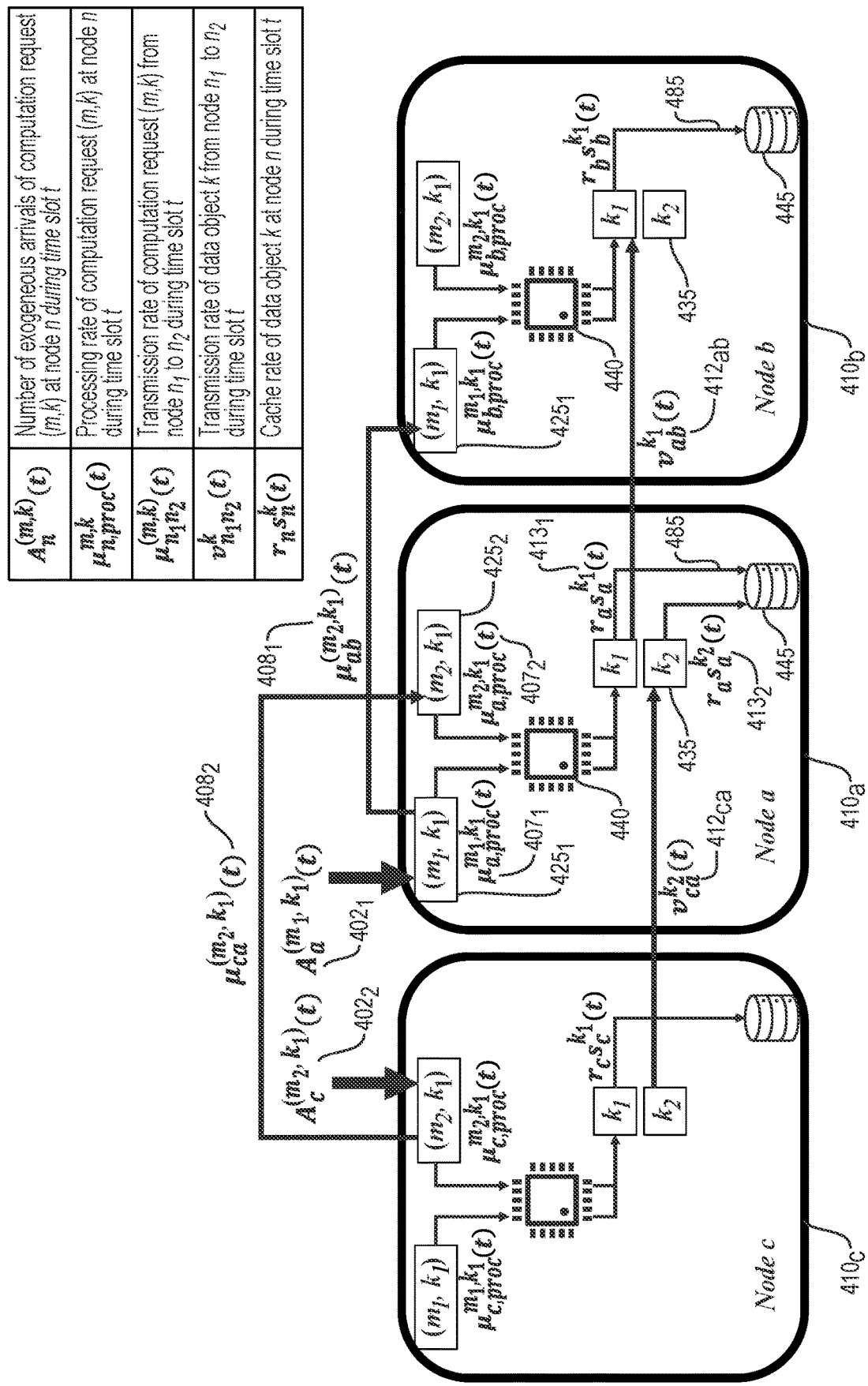
FIG. 4 is a schematic block diagram showing individual operation and interaction of three nodes in an embodiment of a computing-based network.

FIG. 4 is a graphical representation of the dynamics of virtual interests within the virtual plane 390. In some embodiments, time slots of length 1 (without loss of generality) may be indexed by t=1, 2, . . . , where time slot t refers to the interval [t, t+1). Nodes $410_a$, $410_b$, $410_c$ n∈ $\mathcal{V}$ may keep separate queues for computation requests $425_1$, $425_2$ (m,k)∈ $\mathcal{R}$. The CRC 317 for computation requests $425_1$, $425_2$ (m,k) at the beginning of time slot t may be denoted by $Y_n^{(m,k)}(t)$. The nodes $410_a$, $410_b$, $410_c$ also may keep separate queues for data requests 230 corresponding to data objects 435 k∈ $\mathcal{D}$. The DRC for the data objects 435 at the beginning of time slot t may be denoted by $V_n^k(t)$. Initially all computation request and data request queues may be empty, i.e., $Y_n^{(m,k)}(1)=V_n^k(1)=0$ for all n, m, k. For each computation request $425_1$, $425_2$ (m,k) entering the network, the count $Y_n^{(m,k)}$ may be increased accordingly at the entry nodes. In the virtual plane 390, it can be assumed that at each time slot t, each node $410_a$, $410_b$, $410_c$ n∈ $\mathcal{V}$ can access any data object 435 k∈ $\mathcal{D}$. Thus, the node $410_a$, $410_b$, $410_c$ n can process any computation request $425_1$, $425_2$ (m,k) or cache any data object 435 in the virtual plane 390 without waiting for the data to be fetched. This assumption allows for designing an elegant computer-implemented method in the virtual plane 390. Based on this assumption, processors 440 and caches 445 act as sinks for the CRCs 317 and the DRCs 318 respectively. The caches 445 may be any non-transitory computer-readable medium 245. The node $410_a$, $410_b$, $410_c$ n may decrease its CRC counts 317 by processing them in the virtual plane 390 and may decrease its DRC 318 counts by caching the corresponding data object 435 in the virtual plane 390. On the other hand, processing a computation task at the node $410_a$, $410_b$, $410_c$ n may result in an increased local demand for the required data object 435 in the node $410_a$, $410_b$, $410_c$ n. In order to capture this, processing computation requests $425_1$, $425_2$ (m,k) in the virtual plane may lead to an increase in the DRCs 318 for the corresponding data objects 435. The node $410_a$, $410_b$, $410_c$ n can also forward computation requests $425_1$, $425_2$ (m,k) and data requests 230 to their neighbors.

A number of exogenous computation request arrivals $402_1$, $402_2$ at node n for computation request $425_1$, $425_2$ (m,k) during time slot t may be represented by $A_n^{(m,k)}(t)$. For every computation request $425_1$, $425_2$ (m,k) arriving at the node $410_a$, $410_b$, $410_c$ n, a corresponding CRC 317 may be generated at the node $410_a$, $410_b$, $410_c$ n, i.e., $Y_n^{(m,k)}(t)$ may be incremented by 1. A long term exogenous arrival rate at the node $410_a$, $410_b$, $410_c$ n for computation request $425_1$, $425_2$ (m,k) may be $$\lambda_n^{(m,k)} \triangleq \lim_{t\to\infty} \frac{1}{t} \sum_{\tau=1}^{t} A_n^{(m,k)}(\tau).$$

The allocated transmission rate $408_1$ for computation request $425_1$ (m,k) on link (a,b) during time slot t may be represented by $\mu_{ab}^{(m,k)}(t)$. Also, the allocated transmission rate $412_{ab}$ of data requests 230 for data object 435 k on link (a,b) during time slot t may be represented by $v_{ab}^k(t)$. At each time slot, a single message between node $410_a$ a and node $410_b$ b can summarize all virtual interest transmissions during time slot t. The allocated processing rate $407_1$, $407_2$ for computation request $425_1$, $425_2$ (m,k) at the node $410_a$, $410_b$, $410_c$ n during time slot t may be denoted by $\mu_{n,proc}^{(m,k)}(t)$. As mentioned before, in order to capture the local demand for data objects 435, for each computation request $425_1$, $425_2$ (m,k) that is processed (i.e. its CRC 317 is decreased by 1), a data request 230 may be generated (i.e. its DRC 318 is increased by 1). The caching state for data object 435 k at the node $410_a$, $410_b$, $410_c$ n during slot t in the virtual plane 390 may be represented by $s_n^k(t) \in \{0,1\}$, where $s_n^k(t)=1$ if the data object 435 k is cached at the node $410_a$, $410_b$, $410_c$ n during slot t, and $s_n^k(t)=0$ otherwise. It should be noted that even if $s_n^k(t)=1$, the cache at the node $410_a$, $410_b$, $410_c$ n can satisfy only a limited number of interests during one time slot. This is because there is a maximum rate $r_n$ $413_1$, $413_2$ (in objects per slot) at which the node $410_a$, $410_b$, $410_c$ n can produce copies of the cached data object 435 k. These dynamics can be written in detail as follows:

$$Y_n^{(m,k)}(t+1) \leq \qquad (1)$$
$$\left(Y_n^{(m,k)}(t) - \sum_{b\in\mathcal{V}} \mu_{nb}^{(m,k)}(t) - \mu_{n,proc}^{(m,k)}(t)\right)^+ + \sum_{a\in\mathcal{V}} \mu_{an}^{(m,k)}(t) + A_n^{(m,k)}(t)$$

$$V_n^k(t+1) \leq \qquad (2)$$
$$\left(V_n^k(t) - \sum_{b\in\mathcal{V}} v_{nb}^k(t) - r_n s_n^k(t)\right)^+ + \sum_{m\in\mathcal{F}} \mu_{n,proc}^{(m,k)}(t) + \sum_{a\in\mathcal{V}} v_{an}^k(t)$$

where $(x)^+ \triangleq \max\{x, 0\}$.

Also, $V_{src(k)}^k(t) = 0$ for all $t \geq 1$, and $Y_{src(k)}^{(m,k)} = 0$ for all $m \in \mathcal{F}$, for all $t \geq 1$.

From (1) and (2), it can be seen that the CRCs 317 for computation requests $425_1$, $425_2$ (m,k) are decreased as the computation requests $425_1$, $425_2$ (m,k) are processed with processing rate $407_1$, $407_2$ $\mu_{n,proc}^{(m,k)}(t)$, and DRCs for data object 435 k are decreased with cache rate $413_1$, $413_2$ In if the node $410_a$, $410_b$, $410_c$ n decides to cache the data object 435 k in the virtual plane 390 ($s_n^k(t)=1$). If there are any computation requests $425_1$, $425_2$ (m,k) or data requests 230 left in the respective queues at node $410_a$, 410, $410_c$ n, they may be transmitted to neighboring nodes with rate $\Sigma_b \mu_{nb}^{(m,k)}(t)$ and $\Sigma_b v_{nb}^k(t)$ respectively. The exogenous arrivals $402_1$, $402_2$ $A_n^{(m,k)}(t)$ and endogenous arrivals $\Sigma_a \Sigma_{an}^{(m,k)}(t)$ during time slot t may be added to the computation request queue at the end of time slot. The number of computation requests $425_1$, $425_2$ (m,k) processed corresponding to the data object 435 k and the endogenous arrivals $\Sigma_a v_{an}^k(t)$ during time slot t may be added to the data request queue at the end of time slot t. It should be noted that (1) is an inequality since the number of computation requests $425_1$, $425_2$ (m,k) arriving in the queue at the node $410_a$, $410_b$, $410_c$ n during slot t may be less than $\Sigma_a \mu_{an}^{(m,k)}(t)$ if the neighboring nodes have little or no computation requests $425_1$, $425_2$ (m,k) to transmit. Also (2) is an inequality because the number of data requests 230 for the data object 435 k arriving in the queue at the node $410_a$, $410_b$, $410_c$ n during slot t may be less than $\Sigma_b v_{nb}^k(t)$ and the number of data requests 230 created due to the processing of computation requests $425_1$, $425_2$ (m,k) might be less than $\Sigma_m \mu_{n,proc}^{(m,k)}(t)$ if the node $410_a$, $410_b$, $410_c$ n has few or no computation requests $425_1$, $425_2$ (m,k) to process.

Figure 5:
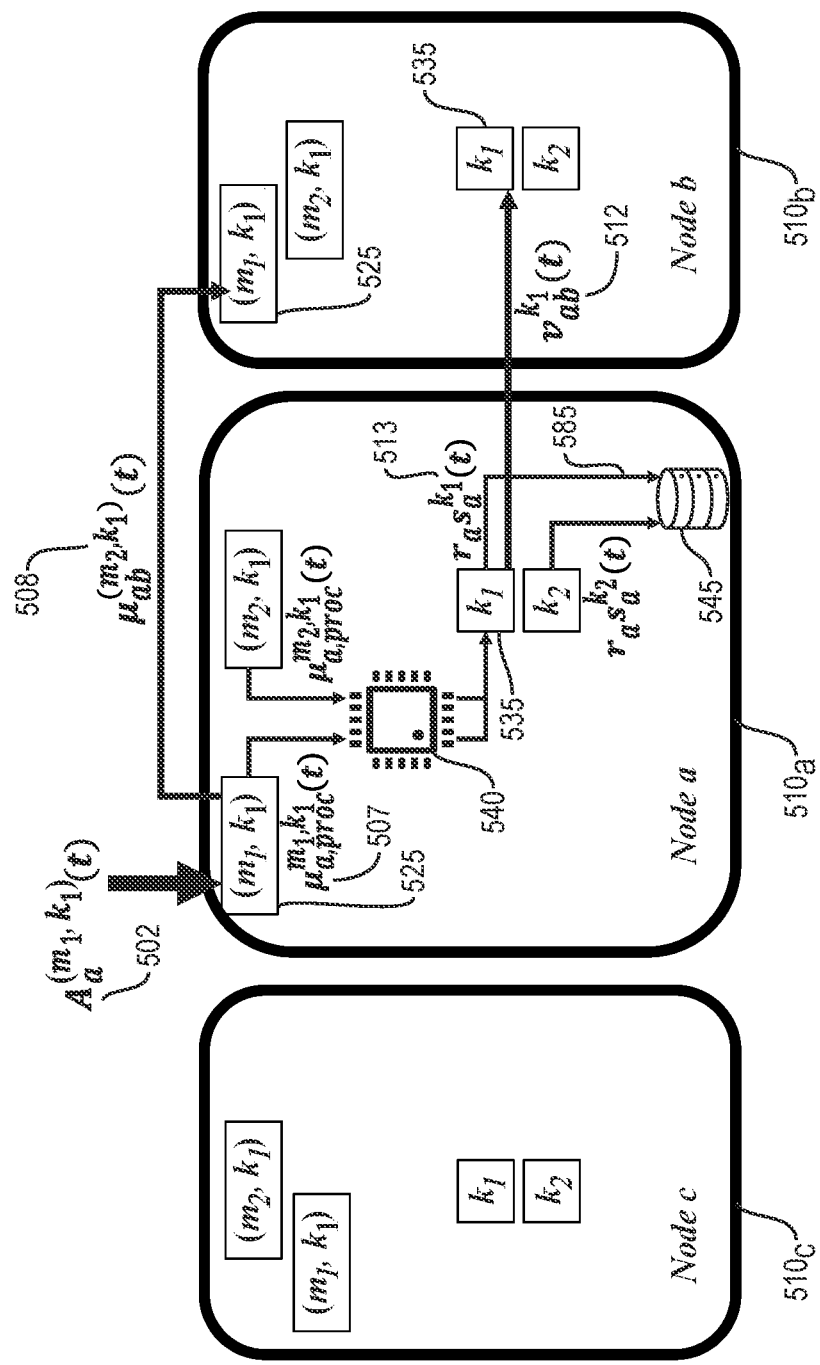
FIG. 5 is a schematic block diagram showing operation of a single node and its interaction with neighboring nodes in an embodiment of a computing-based network.

FIG. 5 is a graphical representation of the dynamics of virtual interests within the virtual plane 390 at node a. In some embodiments, time slots of length 1 (without loss of generality) may be indexed by t=1, 2, . . . , where time slot t refers to the interval [t, t+1). Node $510_a$ a∈ $\mathcal{V}$ may keep separate queues for computation requests 525 (m,k)∈ $\mathcal{R}$. The CRC 317 for computation requests 525 (m,k) at the beginning of time slot t may be denoted by $Y_a^{(m,k)}(t)$. The node $510_a$ a also may keep separate queues for data requests 230 corresponding to data objects 535 k∈ $\mathcal{D}$. The DRC for the data objects 535 at the beginning of time slot t may be denoted by $V_a^k(t)$. Initially all computation request and data request queues may be empty, i.e., $Y_a^{(m,k)}(1)=V_a^k(1)=0$. For each computation request 525 (m,k) entering the network, the count $Y_n^{(m,k)}$ may be increased accordingly at the entry nodes. In the virtual plane 390, it can be assumed that at each time slot t, the node $510_a$ a can access any data object 535 k∈ $\mathcal{D}$. Thus, the node $510_a$ a can process any computation request 525 (m,k) or cache any data object 535 in the virtual plane 390 without waiting for the data to be fetched. This assumption allows for designing an elegant computer-implemented method in the virtual plane 390. Based on this assumption, processors 540 and caches 545 act as sinks for the CRCs 317 and the DRCs 318 respectively. The caches 545 may be any non-transitory computer-readable medium 245. The node $510_a$ a may decrease its CRC counts 317 by processing them in the virtual plane 390 and may decrease its DRC 318 counts by caching the corresponding data object 535 in the virtual plane 390. On the other hand, processing a computation task at the node $510_a$ a may result in an increased local demand for the required data object 535 at the node $510_a$ a. In order to capture this, processing computation request 525 (m,k) in the virtual plane may lead to an increase in the DRCs 318 for the corresponding data objects 535. The node $510_a$ a can also forward computation requests 525 (m,k) and data requests 230 to its neighbors. The neighbors of the node $510_a$ a may include the node $510_b$ b and the node $510_c$ c.

A number of exogenous computation request arrivals 502 at the node a for computation request 525 (m,k) during time slot t may be represented by $A_a^{(m,k)}(t)$. For every computation request 525 (m,k) arriving at the node $510_a$ a, a corresponding CRC 317 may be generated at the node $510_a$ a, i.e., $Y_a^{(m,k)}(t)$ may be incremented by 1. A long term exogenous arrival rate at the node $510_a$ a for computation request 525 (m,k) may be $$\lambda_a^{(m,k)} \triangleq \lim_{t \to \infty} \frac{1}{t} \sum_{\tau=1}^{t} A_a^{(m,k)}(\tau).$$

The allocated transmission rate 508 for computation request 525 (m,k) on link (a,b) during time slot t may be represented by $\mu_{ab}^{(m,k)}(t)$. Also, the allocated transmission rate 512 of data requests 230 for data object 535 k on link (a,b) during time slot t may be represented by $v_{ab}^k(t)$. At each time slot, a single message between the node $510_a$ a and the node $510_b$ b can summarize all virtual interest transmissions during time slot t. The allocated processing rate 507 for computation request 525 (m,k) at the node $510_a$ a during time slot t may be denoted by $\mu_{a,proc}^{(m,k)}(t)$. As mentioned before, in order to capture the local demand for data objects 535, for each computation request 525 (m,k) that is processed (i.e. its CRC 317 is decreased by 1), a data request 230 may be generated (i.e. its DRC 318 is increased by 1). The caching state for data object 535 k at the node $510_a$ a during slot t in the virtual plane 390 may be represented by $s_a^k(t) \in \{0,1\}$, where $s_a^k(t)=1$ if the data object 535 k is cached at the node $510_a$ a during slot t, and $s_n^k(t)=0$ otherwise. It should be noted that even if $s_a^k(t)=1$, the cache at the node $510_a$ a can satisfy only a limited number of interests during one time slot. This is because there is a maximum rate $r_a$ 513 (in objects per slot) at which the node $510_a$ a can produce copies of the cached data object 535 k. These dynamics can be written in detail as follows:

$$Y_a^{(m,k)}(t+1) \leq \qquad (1a)$$
$$\left(Y_a^{(m,k)}(t) - \sum_{b \in \mathcal{V}} \mu_{ab}^{(m,k)}(t) - \mu_{a,proc}^{(m,k)}(t)\right)^+ + \sum_{a \in \mathcal{V}} \mu_a^{(m,k)}(t) + A_n^{(m,k)}(t)$$

$$V_a^k(t+1) \leq \qquad (2a)$$
$$\left(V_a^k(t) - \sum_{b \in \mathcal{V}} v_b^k(t) - r_a s_a^k(t)\right)^+ + \sum_{m \in \mathcal{F}} \mu_{a,proc}^{(m,k)}(t) + \sum_{a \in \mathcal{V}} v_a^k(t)$$

where $(x)^+ \triangleq \max\{x, 0\}$.

Also, $V_{src(k)}^k(t) = 0$ for all $t \geq 1$, and $Y_{src(k)}^{(m,k)} = 0$ for all $m \in \mathcal{F}$, for all $t \geq 1$.

From (1a) and (2a), it can be seen that the CRCs 317 for computation request 525 (m,k) are decreased as the computation requests 525 (m,k) are processed with processing rate 507 $\mu_{a,proc}^{(m,k)}(t)$ and DRCs for data object 535 k are decreased with cache rate 513 $r_a$ if the node $510_a$ a decides to cache the data object 535 k in the virtual plane 390 ($s_a^k(t)=1$). If there are any computation requests 525 (m,k) or data requests 230 left in the respective queues at node $510_a$ a, they may be transmitted to neighboring nodes with rate $\Sigma_b \mu_{ab}^{(m,k)}(t)$ and $\Sigma_b v_{ab}^k(t)$ respectively. The exogenous arrivals 502 $A_a^{(m,k)}(t)$ and endogenous arrivals $\Sigma_c \mu_{ca}^{(m,k)}(t)$ during time slot t may be added to the computation request queue at the end of time slot. The number of computation requests 525 (m,k) processed corresponding to the data object 535 k and the endogenous arrivals $\Sigma_a v_{ab}^k(t)$ during time slot t may be added to the data request queue at the end of time slot t. It should be noted that (1a) is an inequality since the number of computation requests 525 (m,k) arriving in the queue at the node $510_a$ a during slot t may be less than $\Sigma_c \mu_{ca}^{(m,k)}(t)$ if the neighboring nodes have little or no computation requests 525 (m,k) to transmit. Also (2a) is an inequality because the number of data requests 230 for the data object 535 k arriving in the queue at the node $510_a$, a during slot t may be less than $\Sigma_b v_{ab}^k(t)$ and the number of data requests 230 created due to the processing of computation requests 525 (m,k) might be less than $\mu_m \mu_{a,proc}^{(m,k)}(t)$ if the node $510_a$, a has few or no computation requests 525 (m,k) to process.

In some embodiments, a distributed policy may be based on Lyapunov drift minimization for throughput optimal decision making in the virtual plane. A drift minimization problem may result in two different LP problems for allocating processing and transmission rates. The drift minimization problem also involves solving a knapsack problem for caching decisions which is NP-hard in general, but can be solved efficiently using approximation techniques or dynamic programming at each node. When the size of data objects are equal and/or the size of results are equal and/or the computation loads are equal, this joint problem is simpler to solve.

Following is a description of an embodiment of a joint processing, transmission and caching policy in the virtual plane 390.

Computer-implemented method 1. At the beginning of each time slot t, an observation of the CRCs 317 $(Y_n^{(m,k)}(t))_{n \in \mathcal{V}, (m,k) \in \mathcal{R}}$ and DRCs 318 $(V_n^k(t))_{n \in \mathcal{V}, k \in \mathcal{D}}$ may lead to decisions on processing, transmission and caching in the virtual plane 390 as follows:

Processing: at each node $410_a$, $410_b$, $410_c$ n, processing rates of computation requests $425_1$, $425_2$ (m,k) may be chosen by solving the following LP:

$$\text{maximize } \sum_{(m,k)\in\mathcal{R}} \mu_{n,proc}^{(m,k)}(t)\big(Y_n^{(m,k)}(t) - V_n^k(t)\big) \quad (3)$$

$$\text{subject to } \sum_{(m,k)\in\mathcal{R}} q_{(m,k)} \mu_{n,proc}^{(m,k)}(t) \le P_n \quad (4)$$

Transmission: at each node $410_a$, $410_b$, $410_c$ n, transmission rate of computation requests $425_1$, $425_2$ (m,k) and data requests 230 of data object 435 k may be chosen by solving the following LP:

$$\text{maximize } \sum_{(m,k)\in\mathcal{R}} \mu_{nb}^{(m,k)}(t)\big(Y_n^{(m,k)}(t) - Y_b^{(m,k)}(t)\big) + \quad (5)$$
$$\sum_{k\in\mathcal{D}} v_{nb}^k(t)\big(V_n^k(t) - V_b^k(t)\big)$$

$$\text{subject to } \sum_{k\in\mathcal{D}} L_k v_{nb}^k(t) + \sum_{(m,k)\in\mathcal{R}} Z_{(m,k)} \mu_{nb}^{(m,k)}(t) \le C_{bn} \quad (6)$$

Caching: at each node $410_a$, $410_b$, $410_e$ n, caching variables may be chosen by solving the following knapsack problem:

$$\text{maximize } \sum_{k\in\mathcal{D}} V_n^k(t) s_n^k(t) \quad (7)$$

$$\text{subject to } \sum_{k\in\mathcal{D}} L_k s_n^k(t) \le C_n \quad (8)$$

An important aspect of computer-implemented method 1 is it being distributed. It can be seen that processing and caching decisions may be solved at each node separately and each node may exchange the CRCs 317 and DRCs 318 only with its own neighbors in the transmission decision problem.

It is worth noting that in a network with equal-sized data, the knapsack caching problem (7)-(8) reduces to a max-weight problem which is solvable in linear time at each node. In a scenario where computation result sizes are also equal, the LP for transmission rates (5)-(6) turns into a computer-implemented backpressure method on each link. Finally in a scenario where computation loads are equal, the LP problem for processing rates (3)-(4) turns into a backpressure-like computer-implemented method between computation request and data request queues at each node. Consider a network where all data sizes are equal ($L_k = L$ $\forall k \in \mathcal{D}$), all result sizes are equal ($Z_{(m,k)} = Z$ $\forall (m,k) \in \mathcal{R}$) and all computation loads are equal ($q_{(m,k)} = q$ $\forall (m,k) \in \mathcal{R}$). In this situation computer-implemented method 1 can be reduced to a simple computer-implemented backpressure and sorting method.

Computer-implemented method 2. In a network with $L_k = L$, $Z_{(m,k)} = Z$, $q_{(m,k)} = q$, at the beginning of each time slot t, observe the CRCs 317 $(Y_n^{(m,k)}(t))_{n\in\mathcal{V},(m,k)\in\mathcal{R}}$ and DRCs 318 $(V_n^k(t))_{n\in\mathcal{V},k\in\mathcal{D}}$ and decide on processing, forwarding and caching in the virtual plane as follows.

Processing: at each node $410_a$, $410_b$, $410_c$ n, for each computation request $425_1$, $425_2$ (m,k)$\in \mathcal{R}$ choose:

$$\mu_{n,proc}^{(m,k)}(t) = \begin{cases} \dfrac{P_n}{q} & W_{n,proc}^*(t) > 0 \text{ and } (m,k) = (m,k)^* \\ 0 & \text{otherwise.} \end{cases} \quad (9)$$

$$W_{n,proc}^{(m,k)}(t) = Y_n^{(m,k)}(t) - V_n^k(t) \quad (10)$$

$$(m,k)^* = \underset{(m,k)}{\operatorname{argmax}} \; W_{n,proc}^{(m,k)}(t)$$

-continued
$$W_{n,proc}^*(t) = \big(W_{n,proc}^{(m,k)*}(t)\big)^+$$

Transmission: at each node $410_a$, $410_b$, $410_c$ n, for each computation request $425_1$, $425_2$ (m,k)$\in \mathcal{R}$ and each data object 430 k$\in \mathcal{D}$ choose:

$$\mu_{nb}^{(m,k)}(t) = \begin{cases} \dfrac{C_{bn}}{Z} & \dfrac{W_{nb}^*(t)}{Z} \ge \dfrac{G_{nb}^*(t)}{L}, W_{nb}^*(t) > 0, (m,k) = (m,k)^{**} \\ 0 & \text{otherwise.} \end{cases} \quad (11)$$

$$v_{nb}^k(t) = \begin{cases} \dfrac{C_{bn}}{L} & \dfrac{G_{nb}^*(t)}{L} > \dfrac{W_{nb}^*(t)}{Z}, G_{nb}^*(t) > 0, k = k^* \\ 0 & \text{otherwise.} \end{cases}$$

$$W_{nb}^{(m,k)}(t) = Y_n^{(m,k)}(t) - Y_b^{(m,k)}(t), G_{nb}^k(t) = V_n^k(t) - V_b^k(t) \quad (12)$$

$$(m,k)^{**} = \underset{(m,k)}{\operatorname{argmax}} \; W_{nb}^{(m,k)}(t), \; k^* = \underset{k}{\operatorname{argmax}} \; G_{nb}^k(t)$$

$$W_{nb}^*(t) = \big(W_{nb}^{(m,k)*}(t)\big)^+, \; G_{nb}^*(t) = \big(G_{nb}^{k*}(t)\big)^+$$

Caching: at each node $410_a$, $410_b$, $410_c$ n, $(d_1, d_2, \ldots, d_K)$ may be a permutation of $\mathcal{D}$ such that $$V_n^{d_1} \ge V_n^{d_2} \ge \ldots \ge V_n^{d_K} \text{ let } i_n = \left\lfloor \dfrac{C_n}{L} \right\rfloor,$$

then choose $$s_n^k(t) = \begin{cases} 1 & k \in \{k_1, k_2, \ldots, k_{i_n}\} \\ 0 & \text{otherwise.} \end{cases}$$

In computer-implemented method 2, each node $410_a$, $410_b$, $410_c$ n at each time t allocates the entire normalized processor capacity $$\left(\dfrac{P_n}{q}\right)$$

to process the computation request (m,k)* which has the maximum difference between its CRC 317 and DRC 318 for the required data object 435 k as shown in (9)-(10). The intuition behind this is important. The optimal policy allocates the processing capacity to the computation request for which there is relatively high local demand, i.e. large CRC 317, and low local demand for the required data object, i.e. low DRC 318, often due to the data object being cached in close vicinity.

Each node $410_a$, $410_b$, $410_c$ n at each time t for transmission on any outgoing link (n,b)$\in \mathcal{E}$ may choose the CRC 317 or DRC 318 that has the maximum backlog difference on the link normalized by size (Z for CRCs 317 and L for DRCs 318) and may allocate the entire normalized reverse link capacity (normalized by Z if the chosen count is a CRC and by L if the chosen count is a DRC) to it as shown in (11)-(12). As for caching, each node $410_a$, $410_b$, $410_c$ n with capacity to cache $$i_n = \left\lfloor \dfrac{C_n}{L} \right\rfloor$$

data objects, may choose $i_n$ data objects with highest DRC counts to be cached in the virtual plane. It should be noted that in computer-implemented method 2, at each node $410_a$, $410_b$, $410_c$ n the computational complexity is $O(|\mathcal{F}|\times|\mathcal{D}|)$ for processing policy, $O(|\mathcal{V}|\times|\mathcal{F}|\times|\mathcal{D}|)$ for transmission policy and $O(|\mathcal{D}|)$ for caching policy.

Computer-implemented method 2 maximizes the throughput in the virtual plane 390 with proper constraints on processing rates, transmission rates and caches as shown below. The following assumptions can be made:

Exogenous computation request arrival processes $402_1$, $402_2$ (which are also CRC 317 arrival processes as mentioned before) $\{A_n^{(m,k)}(t); t=1, 2, \ldots\}$ are mutually independent with respect to n, (m,k).

$\{A_n^{(m,k)}(t); t=1, 2, \ldots\}$ are independent and identically distributed with respect to t for all $n \in \mathcal{V}$, $(m,k) \in \mathcal{R}$ For all $n \in \mathcal{V}$, $(m,k) \in \mathcal{R}$, $A_n^{(m,k)}(t) \leq A_{n,max}^{(m,k)}$ for all t where $A_{n,max}^{(m,k)} \in \mathbb{R}_+$.

As for the constraints, during each time slot a node cannot store more than its cache capacity and cannot process computation requests more than processor capacity. For each computation interest packet 387 sent on a link, a result comes back on the reverse link eventually and for each data interest packet 388 sent on a link, a data object 335 traverses back on the reverse link. Since it can be assumed that the sizes of interest packets are negligible compared to the sizes of results 367 and data objects 335, when sending interest packets on a link (a,b) the reverse link capacity should be taken into account. These constraints should be reflected in the virtual plane 390 and can be summarized as follows:

$$\sum_{k \in \mathcal{D}} L_k s_n^k(t) \leq C_n \forall n \in \mathcal{V} \quad (13)$$

$$\sum_{(m,k) \in \mathcal{R}} q_{(m,k)} \mu_{n,proc}^{(m,k)}(t) \leq P_n \forall n \in \mathcal{V} \quad (14)$$

$$\sum_{k \in \mathcal{D}} L_k v_{ab}^k(t) + \sum_{(m,k)} Z_{(m,k)} \mu_{ab}^{(m,k)}(t) \leq C_{ba} \forall (a,b) \in \mathcal{E} \quad (15)$$

In order to show the throughput optimality, a stability region is presented herein for the virtual plane 390. Stability for computation request queues and data request queues at node n can be defined as:

$$\limsup_{t \to \infty} \frac{1}{t} \sum_{\tau=1}^{t} 1_{[Y_n^{(m,k)}(\tau) > \xi]} \to 0 \text{ as } \xi \to \infty$$

$$\limsup_{t \to \infty} \frac{1}{t} \sum_{\tau=1}^{t} 1_{[V_n^k(\tau) > \xi]} \to 0 \text{ as } \xi \to \infty$$

where $1_{\{\cdot\}}$ is an indicator function. The stability region $\Lambda$ is the closure of the set of all computation arrival rates defined as $$\lambda_n^{(m,k)} \triangleq \lim_{t \to \infty} \frac{1}{t} \sum_{\tau=1}^{t} A_n^{(m,k)}(\tau)$$

for which there exists some feasible processing, forwarding, and caching policy which can stabilize all computation request queues and data request queues. Feasible can mean that at any time t, the caching vectors $(s_n^k(t))_{k \in \mathcal{D}, n \in \mathcal{V}}$ satisfy (13), the processing rate vector $(\mu_{n,proc}^{(m,k)})_{(m,k) \in \mathcal{R}, n \in \mathcal{V}}$ satisfies (14) and the forwarding rate vector $(\mu_{ab}^{(m,k)})_{(m,k) \in \mathcal{R},(a,b) \in \mathcal{E}}$ satisfies transmission constraints in (15). The following theorem characterizes the stability region in the virtual plane 390:

Theorem 1. The stability region for virtual computation and data interests of the network $\mathcal{G}(\mathcal{V}, \mathcal{E})$ with caching, computation and transmission capacity constraints given by (13)-(14)-(15) and queue dynamics (1)-(2), is the set $\Lambda$ consisting of all computation request arrival rates $\lambda_n^{(m,k)}$ such that there exists computation flow variables $(f_{ab}^{(m,k)})_{(m,k) \in \mathcal{R},(a,b) \in \mathcal{L}}$, data flow variables $(d_{ab}^k)_{k \in \mathcal{D},(a,b) \in \mathcal{L}}$, processing flow variables $(f_{n,proc}^{(m,k)})_{(m,k) \in \mathcal{R}, n \in \mathcal{N}}$ and caching variables $(\beta_{n,i})_{n \in \mathcal{N}; i \in \Psi_n}$ satisfying $$f_{ab}^{(m,k)} \geq 0, f_{nn}^{(m,k)} = 0, f_{src(k)n}^{(m,k)} = 0 \forall a, b, n \in \mathcal{N}, (m,k) \in \mathcal{R} \quad (16)$$

$$f_{ab}^{(m,k)} = 0 \forall a, b \in \mathcal{N}, (m,k) \in \mathcal{R}, (a,b) \notin \mathcal{L} \quad (17)$$

$$d_{ab}^k \geq 0, d_{nn}^k = 0, d_{src(k)n}^k \forall a, b, n \in \mathcal{N}, k \in \mathcal{D} \quad (18)$$

$$d_{ab}^k = 0 \forall a, b \in \mathcal{N}, k \in \mathcal{D}, (a,b) \notin \mathcal{L} \quad (19)$$

$$0 \leq \beta_{n,i} \leq 1 \ i \in \Psi_n \quad (20)$$

$$f_{n,proc}^{(m,k)} \geq 0 \forall n \in \mathcal{N}, (m,k) \in \mathcal{R} \quad (21)$$

$$\lambda_n^{(m,k)} \leq \sum_{b \in \mathcal{V}} f_{nb}^{(m,k)} - \sum_{a \in \mathcal{V}} f_{an}^{(m,k)} + f_{n,proc}^{(m,k)} \forall n \in \mathcal{N}, (m,k) \in \mathcal{R} \quad (22)$$

$$\sum_{a \in \mathcal{V}} d_{an}^k + \sum_m f_{n,proc}^{(m,k)} \leq \sum_{b \in \mathcal{V}} d_{nb}^k + r_n \sum_{i \in \Psi_n} \beta_{n,i} 1[k \in \mathcal{B}_{n,i}] \quad (23)$$

$$\forall n \in \mathcal{N}, (m,k) \in \mathcal{R}$$

$$\sum_{(m,k) \in \mathcal{R}} Z_{(m,k)} f_{ab}^{(m,k)} + \sum_{k \in \mathcal{D}} L_k d_{ab}^k \leq C_{ba} \forall (a,b) \in \mathcal{L} \quad (24)$$

$$\sum_{i \in \Psi_n} \beta_{n,i} = 1 \forall n \in \mathcal{N} \quad (25)$$

$$\sum_{(m,k) \in \mathcal{R}} q_{(m,k)} f_{n,proc}^{(m,k)} \leq P_n \forall n \in \mathcal{N} \quad (26)$$

Where $\Psi_n$ is the set of feasible cache combination for node n.

The following shows that computer-implemented method 1 stabilizes all computation request queues and data request queues in the network for any $\lambda \in int(\Lambda)$, without any knowledge of $\lambda$. As a result computer-implemented method 1 is throughput optimal in the sense of adaptively maximizing the throughput of virtual computation interests.

Theorem 2. (Throughput Optimality) If there exists $\varepsilon = (\varepsilon_n^{(m,k)})_{n \in \mathcal{V},(m,k) \in \mathcal{R}} > 0$ such that $\lambda + \varepsilon \in \Lambda$, then there exists $(\varepsilon_n^{(m,k)'})_{n \in \mathcal{V},(m,k) \in \mathcal{R}}$, $(\varepsilon_n^{k'})_{n \in \mathcal{V}, k \in \mathcal{D}} > 0$ such that the network of computation request queues and data request queues under computer-implemented method 1 satisfies:

$$\limsup_{t \to \infty} \frac{1}{t} \sum_{\tau=1}^{t} \left( \sum_{n,(m,k)} E[Y_n^{(m,k)}(\tau)] + \sum_{n,k} E[V_n^k(\tau)] \right) \leq \frac{NB}{\varepsilon'} \quad (27)$$

where $B \triangleq \frac{1}{2N} \sum_{n \in \mathcal{V}} (\mu_{n,out}^{max} + \mu_{n,proc}^{max} + r_n^{max})^2 + (\mu_{n,in}^{max} + \mu_{n,proc}^{max} + A_n^{max})^2$, $$\varepsilon' \triangleq \min\left\{(\varepsilon_n^{(m,k)'})_{n \in \mathcal{V},(m,k) \in \mathcal{R}'}, (\varepsilon_n^{k'})_{n \in \mathcal{V}, k \in \mathcal{D}}\right\}$$

$$\mu_{n,proc}^{max} \triangleq \frac{P_n}{\min\{q_{(m,k)}\}}, \mu_{n,out}^{max} \triangleq \frac{\sum_b C_{bn}}{\min\{Z_{(m,k)}, L_k\}},$$

-continued $$\mu_{n,in}^{max} \triangleq \frac{\sum_a C_{na}}{\min\{Z_{(m,k)}, L_k\}}, r_n^{max} \triangleq r_n|\mathcal{D}|, A_n^{max} \triangleq \sum_{(m,k)} A_{n,max}^{(m,k)}$$

The following describes an embodiment of a distributed joint policy for performing computation, request forwarding and caching in the actual plane 395 based on the throughput optimal computer-implemented method for the virtual plane 390.

A separate queue for each computation request 125 (m,k)∈ $\mathcal{R}$ and data object 135 k∈ $\mathcal{D}$ may be kept at each node 410$_a$, 410$_b$, 410$_c$ n in the actual plane 395 of DECO. In contrast to the virtual plane 390, when a given node 150 decides to perform 360 a computation request 125 (m,k), the given node 150 may send the computation to the processor 140 if it is the source node 133 of the data object 135 k or if it has the data object 135 k stored in its cache 145. Otherwise the given node 150 may put the computation request in the PCR (k) queue and may issue a data request 130 for the data object 135 k. When the data object 135 k returns to the given node 150, the given node 150 may send all computation requests in the PCR(k) queue at the given node 150 to the processor 140. As for caching, nodes 110 can only cache data objects 135 when they are traversing back on the reverse path toward the entity 105 that submitted the computation request 125.

At each time slot t, each node 410$_a$, 410$_b$, 410$_c$ n may perform 360 computation requests 425$_1$, 425$_2$ of type (m,k)∈ $\mathcal{R}$ with rate $\mu_{n,proc}^{(m,k)*}(t)$ where $\mu_{n,proc}^{(m,k)*}(t)$ is the optimal processing rate in the virtual plane 390 at a node 410$_a$, 410$_b$, 410$_c$ n in time slot t obtained by solving (3),(4). In other words, at each time slot t, each node 410$_a$, 410$_b$, 410$_c$ n may take $\mu_{n,proc}^{(m,k)*}(t)$ computation requests 425$_1$, 425$_2$ of type (m,k) out of its corresponding queue and may send them to the processor if n=src(k) or has the data object 435 k in its cache 445. Otherwise it may put the computation requests 425$_1$, 425$_2$ in the PCR(k) queue and may generate $\mu_{n,proc}^{(m,k)*}(t)$ data interest packets 388 to be forwarded as data requests 130 for the data object 435 k. When the data object 435 k reaches the node 410$_a$, 410$_b$, 410$_c$ n on the reverse path of the data requests 130, the node 410$_a$, 410$_b$, 410$_c$ n may send all the pending computation requests 425$_1$, 425$_2$ in the PCR(k) queue to the processor.

At each time slot t, each node 410$_a$, 410$_b$, 410$_c$ n may transmit $\mu_{nb}^{(m,k)*}(t)$ computation interest packets 387 of computation request 425$_1$, 425$_2$ (m,k) and may transmit $v_{nb}^{k*}(t)$ data interest packets 388 of data object 435 k on outgoing links (n,b)∈ $\varepsilon$ where $\mu_{nb}^{(m,k)*}(t)$ and $v_{nb}^{k*}(t)$ are optimal transmission rates for computation requests 425$_1$, 425$_2$ and data requests 130 in the virtual plane 390 at node 410$_a$, 410$_b$, 410$_c$ n in time slot t obtained by solving (5),(6).

As previously mentioned, in the actual plane 395 nodes can only cache data objects 135 when they are traversing back on the reverse path toward the entity 105 that submitted the computation request 125. Using virtual caching decisions at each time slot directly in the actual plane 395 may leads to oscillatory caching behaviour since data objects 135 can get cached or removed from the cache instantly in the virtual plane 390. The following is an embodiment of a method that results in more stable caching behavior. For a given window size T, the cache score for the data object 135 k at node 410$_a$, 410$_b$, 410$_c$ n at time t may be $$CS_n^k(t) = \frac{1}{T}\sum_{\tau=t-T+1}^{t} s_n^{k*}(\tau)V_n^k(\tau) \quad (28)$$

Where $s_n^{k*}(t)$ is the optimal caching decision for data object 135 k in the virtual plane 390 at node 410$_a$, 410$_b$, 410$_c$ n in time slot t obtained by solving (7)-(8). This cache score averages over the DRCs for data object 135 k in the time slots at which the node 410$_a$, 410$_b$, 410$_c$ n decided to cache the data object 135 k in the virtual plane 390, over a sliding window of size T prior to time slot t. When a data object $k_{new}$ travels back to the requester node, each node 110 on the reverse path may cache the data object $k_{new}$ as long as it has space left in its cache 145. If the cache 145 is full, the node 410$_a$, 410$_b$, 410$_c$ n may compare the cache score for $k_{new}$ with the set of currently cached data objects $\mathcal{K}_{n,old}$. If all data objects are of equal size, $k_{min} \in \mathcal{K}_{n,old}$ may be a currently cached data object with a smallest cache score. If $k_{new}$ has a higher cache score than $k_{min}$, then $k_{min}$ may be evicted and replaced with $k_{new}$. Otherwise, the cache 135 may be unchanged. If data objects have different sizes, the optimal set of data objects is chosen to maximize the total cache score under the cache space constraint. This is a knapsack problem that can be solved using approximation techniques at each node.

Figure 6:
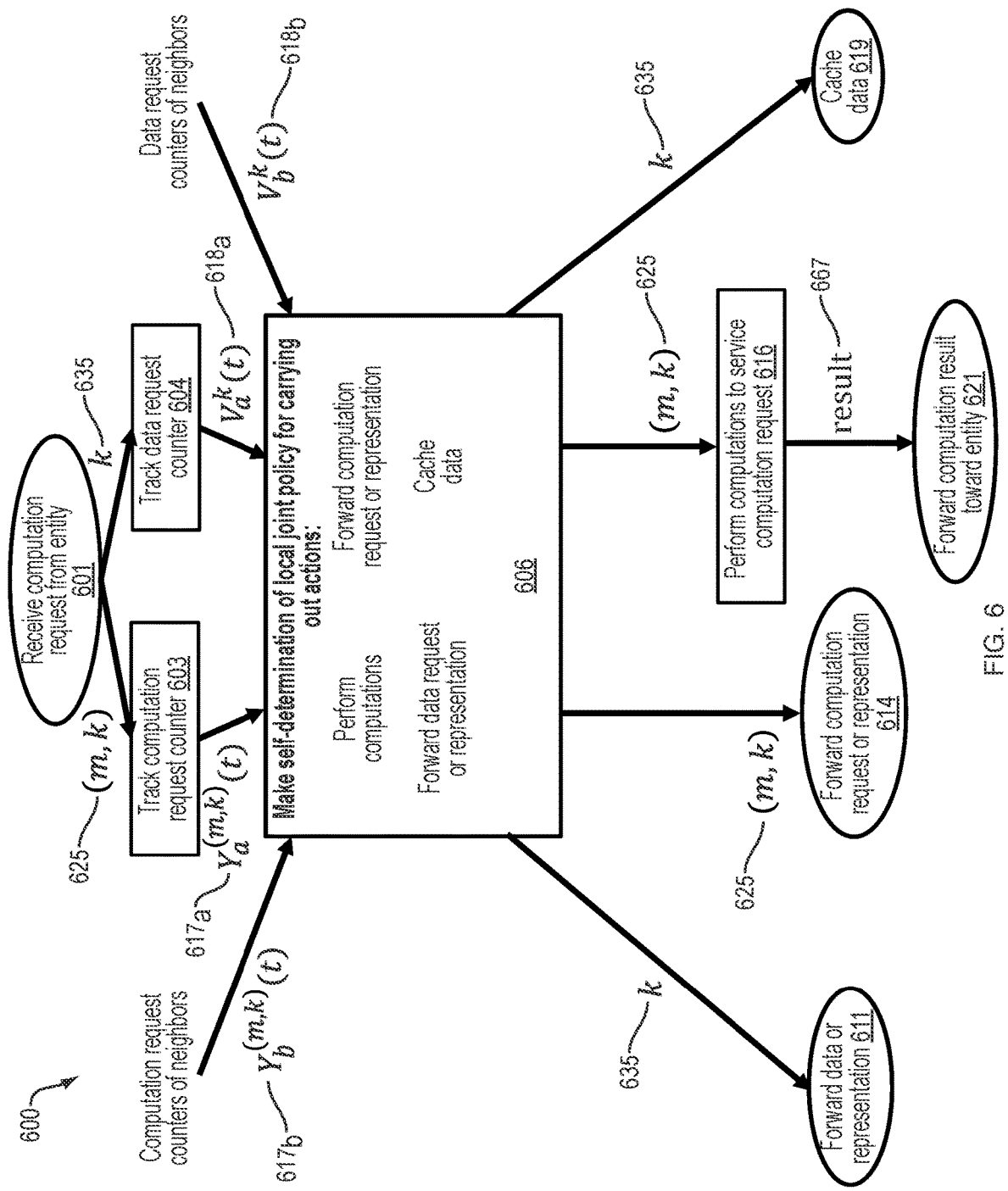
FIG. 6 is a flow diagram showing a framework for joint computation, caching, and request forwarding in an embodiment of a computing-based network.

FIG. 6 shows an embodiment of a method 600 of servicing a computation request 625 to be performed on a data object 635 received 601 from an entity 105 by a node 110 of a computing-based network. The node 110 may track 603 a CRC 617$_a$. The node 110 may also track 604 a DRC 618$_a$. The node 110 may make a self-determination 606 of a local joint policy 627$_a$ for performing computations 616 to service the computation request 625, for forwarding 614 the computation request or a representation thereof or forwarding 611 at least a portion of a data object 635 or a representation thereof, and for caching 619 the at least a portion of the data object 635 or representation thereof. The self-determination 606 may calculate the local joint policy 627$_a$ as a function of the local CRC 617$_a$, the local DRC 618$_a$, and/or the CRCs 6176 and DRCs 6186 of neighboring nodes. The node 110 may perform computations 616 to service the computation request 625, and the node may then forward 621 a result 667 of the computations 616 toward the entity 105. The node 110 may forward 614 the computation request 625 or a representation thereof to neighboring nodes. The node 110 may forward 611 at least a portion of a data object 635 or a representation thereof to neighboring nodes. The node 110 may cache 619 at least a portion of a data object 635 or representation thereof.

Figure 7:
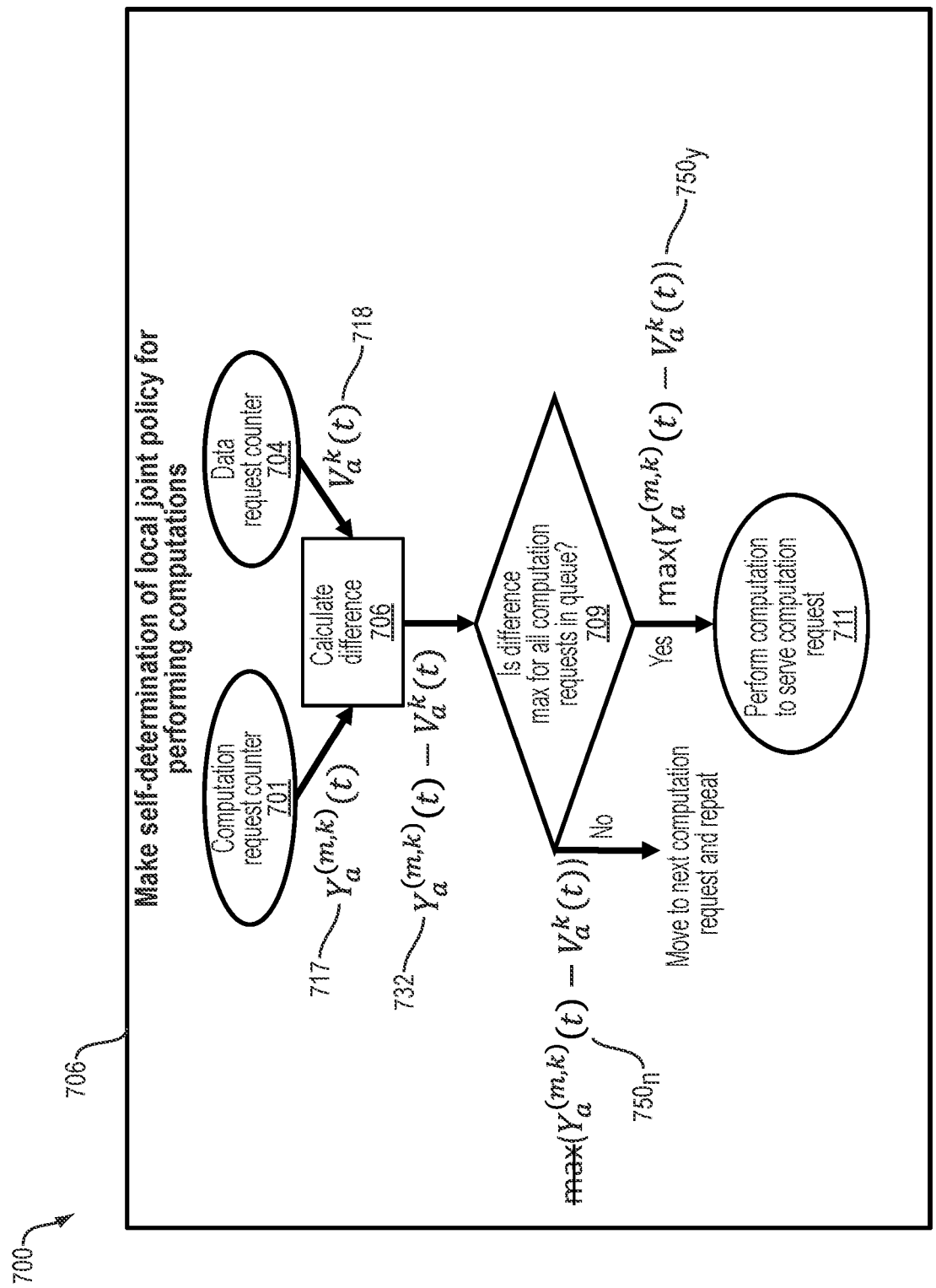
FIG. 7 is a flow diagram showing a self-determination of a local joint policy for performing computations by a node in an embodiment of a computing-based network.

FIG. 7 shows an embodiment of a method 700 of making a self-determination 706 of a local joint policy 627$_a$ for performing computations. A node 110 of a computing-based network may track 701 a CRC 717. The node 110 may also track 704 a DRC 718. The node may calculate 706 a difference 732 between the CRC 717 and the DRC 718. The node may determine 709 if the difference 732 is a maximum difference for all computation requests 125 at the node 110. If the difference 732 is a maximum difference 750$_y$, the node 110 may perform 711 computations to service the computation request 125. If the difference 732 is a non-maximum difference 750$_n$, the node may move to a next computation request and repeat the self-determination for the next request.

Figure 8:
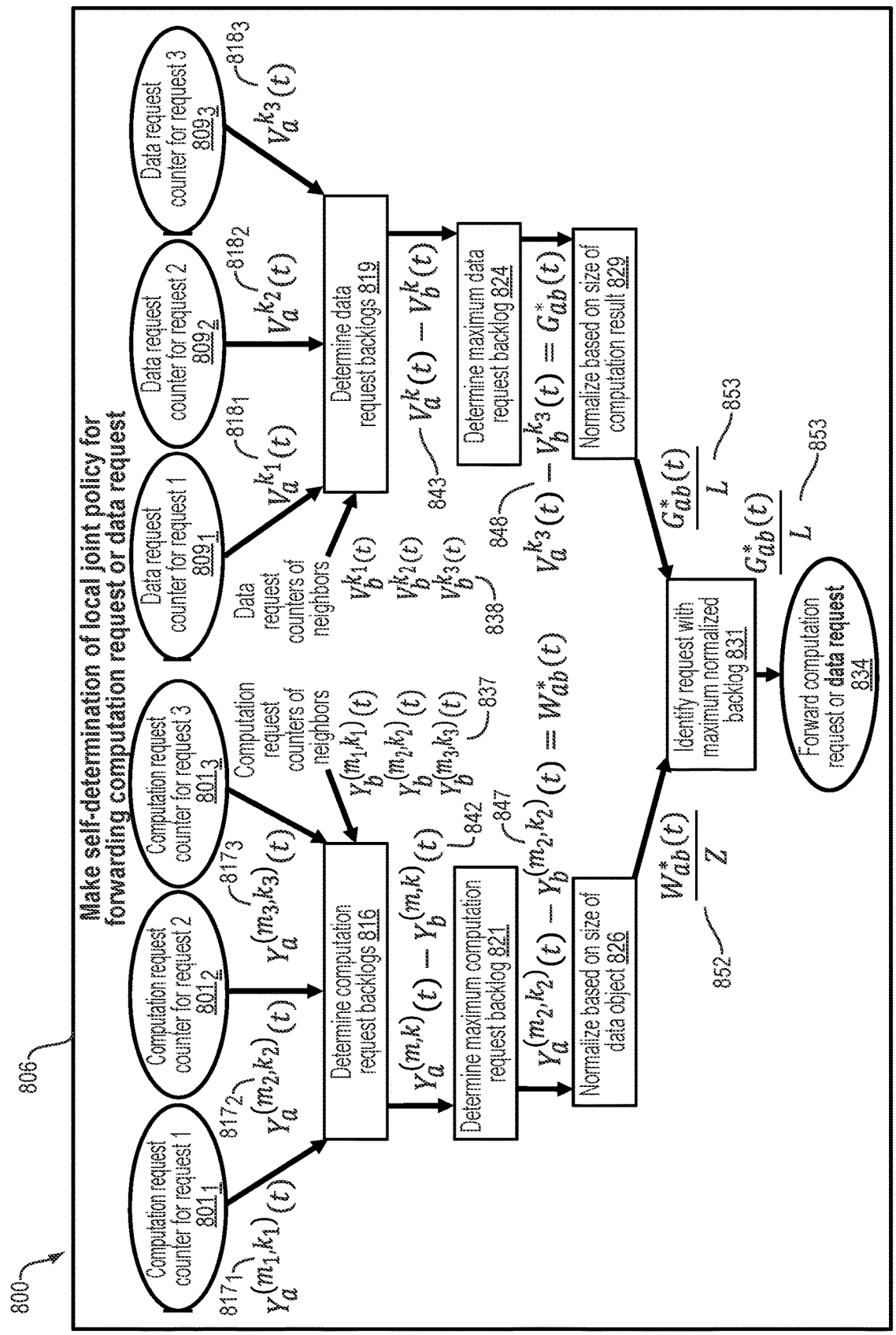
FIG. 8 is a flow diagram showing a self-determination of a local joint policy for forwarding requests by a node in an embodiment of a computing-based network.

FIG. 8 shows an embodiment of a method 800 of making a self-determination 806 of a local joint policy 627$_a$ for forwarding 834 a computation request 125 or a data request 130. A node 110 of a computing-based network 100 may track 801 CRCs 817 of one or more computation requests 125. The node 110 may also track 809 DRCs 818 of one or more data requests 130. The node 110 may perform calculations to determine computation request backlogs 816. The calculations may be differences 842 between local CRCs 817 and CRCs 837 of neighboring nodes for respective computation requests 125. The node 110 may perform calculations to determine data request backlogs 819. The calculations may be differences 843 between local DRCs 818 and DRCs 838 of neighboring nodes for respective data requests. The node 110 may determine 821 a maximum computation request backlog 847. The node 110 may determine 829 a maximum data request backlog 848. The node 110 may calculate 826 one or more normalized maximum computation request backlog 852 based on the size of the corresponding data objects. The node 110 may calculate 829 one or more normalized maximum data request backlog 853 based on the size of the corresponding computation results. From the normalized maximum computation request backlog 852 and normalized data request backlogs 853, the node 110 may identify 831 a request with a maximum normalized backlog. For example purposes, the maximum normalized backlog has been shown to be the maximum normalized data request backlog 853, but the maximum normalized backlog may alternatively be the maximum normalized computation request backlog 852. The node 110 may forward 834 a computation request 125 or a data request 130 corresponding to the maximum normalized backlog.

Figure 9:
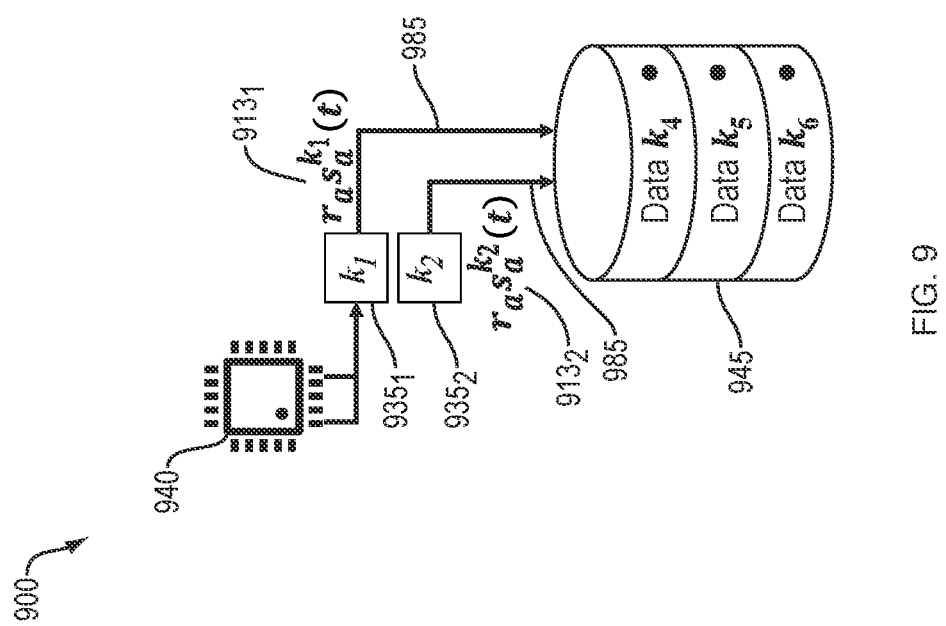
FIG. 9 is a schematic block diagram showing caching of a data object at a node in an embodiment of a computing-based network.

FIG. 9 illustrates an embodiment of an optimal caching policy based on the local joint policy $627_a$. A processor 940 at a node 110 of a computing-based network may be configured to cache 985 a data object 9351, 9352 in a non-transitory computer-readable medium 945 at the node 110. The caching 985 activity may be based on a product 913 of a rate at which a processor 940 can produce copies of the data object and a decision made in the virtual plane 390. The decision may be based on whether the data object has a higher DRC 318 than at least one of the data objects presently cached.

Figure 10:
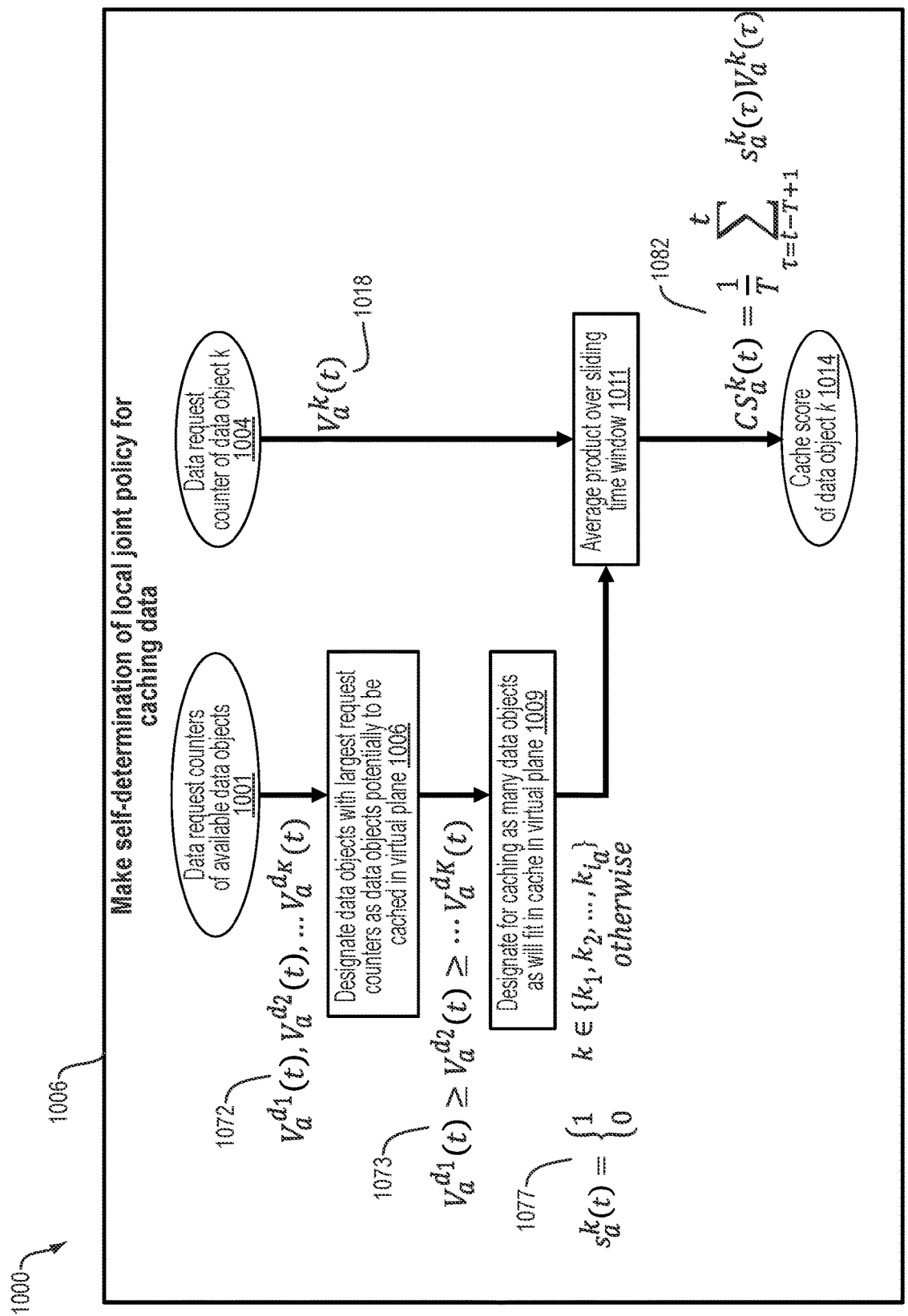
FIG. 10 is a flow diagram showing a self-determination of a local joint policy for caching data by a node in an embodiment of a computing-based network.

FIG. 10 shows an embodiment of a method 1000 of making a self-determination 1006 of a local joint policy $627_a$ for caching data. A node 110 of a computing-based network may track 1001 DRCs 1072 of data objects presently available at the node 110. The node 110 may track 1004 a DRC 1018 of a data object 135 k. The node 110 may designate 1009 for caching as many data objects as will fit in the cache in the virtual plane 390, creating a status 1077 for each of the set of available data objects. The node 110 may calculate 1011 an average, over a sliding time window, of a product of the DRC of the data object 135 k and the caching status 1077 of the data object 135 k from the virtual plane 390, to determine 1014 a cache score 1082 of the data object 135 k.

Figure 11B:
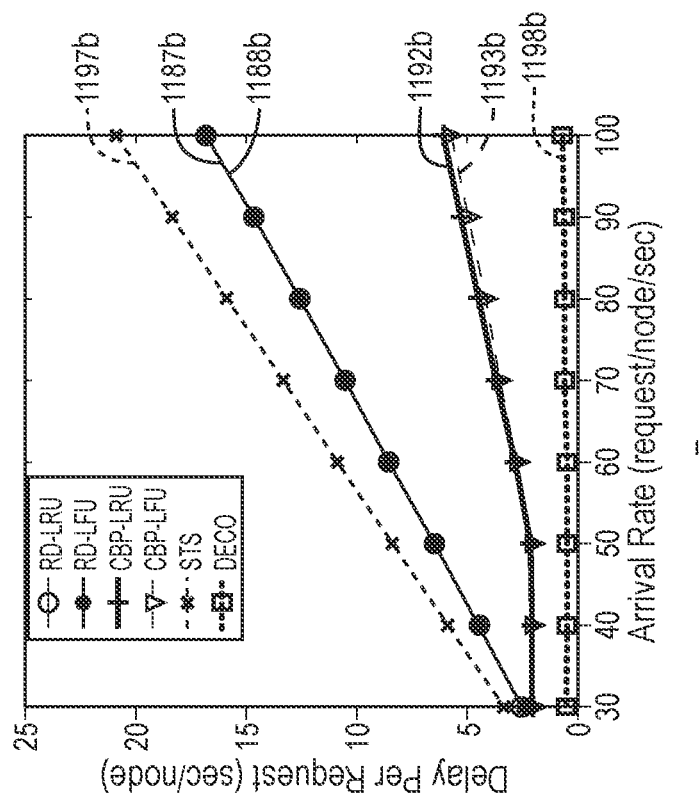
FIG. 11B is a plot showing results of the framework presented herein versus other frameworks for a fog network topology.
Figure 11A:
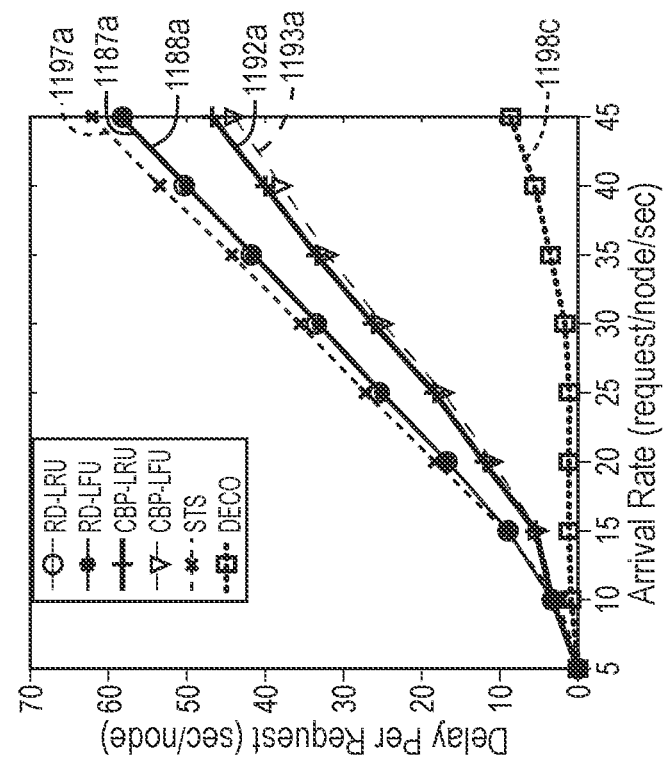
FIG. 11A is plot showing results of the framework presented herein versus other frameworks for an Abilene network topology.
Figure 11D:
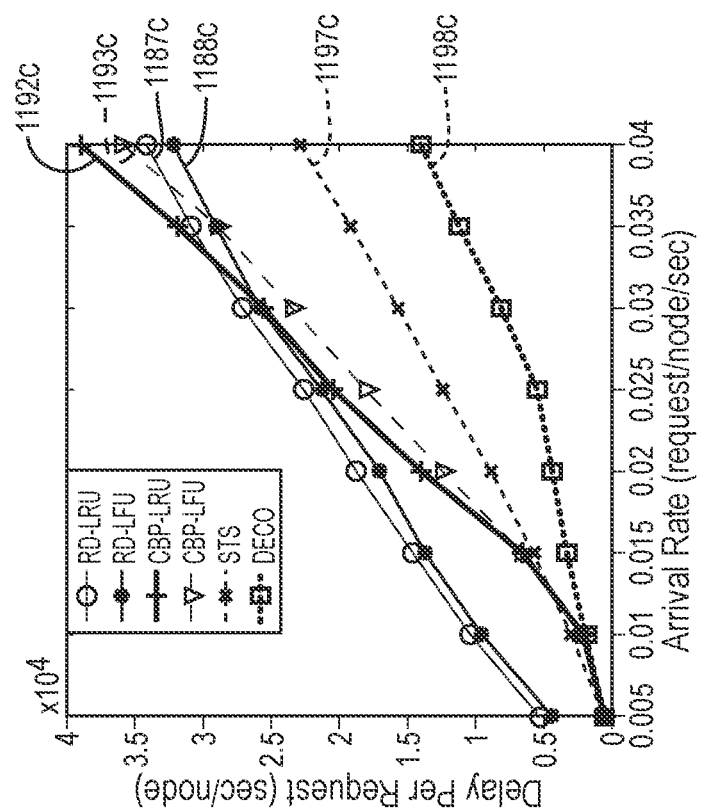
FIG. 11D is a plot showing results of the framework presented herein versus other frameworks for an LHC network topology.
Figure 11C:
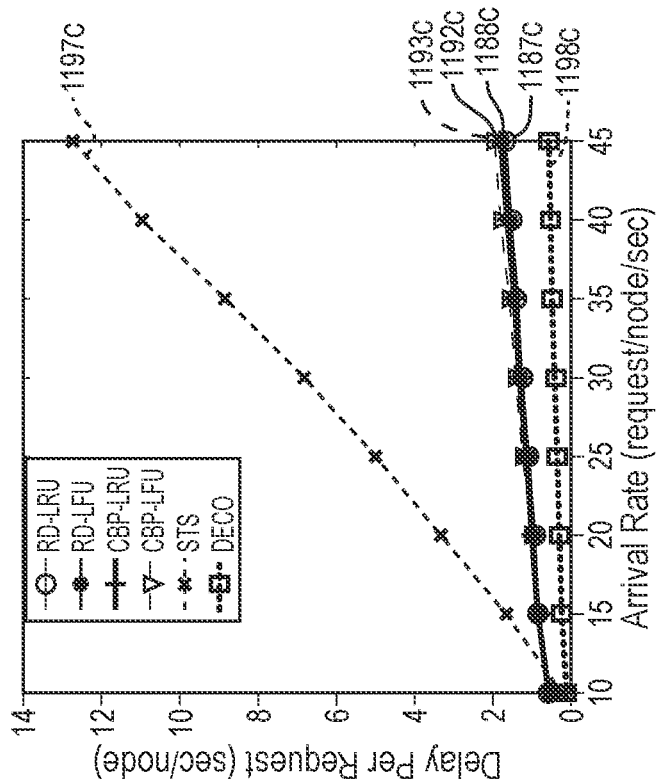
FIG. 11C is a plot showing results of the framework presented herein versus other frameworks for a GÉANT network topology.

FIGS. 11A-11D are representations of results of an experimental evaluation of the DECO framework. Simulations were performed on four different network topologies. Results for the Abilene topology are shown in FIG. 11A, results for a fog computing topology are shown in FIG. 11B, results for the GÉANT topology are shown in FIG. 11C, and results for the Large Hadron Collider (LHC) topology, which is a prominent data-intensive computing network for high energy physics applications, are shown in FIG. 11D.

Experiment Setup. In the Abilene topology, the cache capacity is 30 GB and the processor capacity is $5 \times 10^5$ instructions/sec for all nodes. The link capacity (in both directions) is 240 Gbps for all links. In the Fog topology, the cache capacity is 5 GB for U1, U2, . . . , U12 and 25 GB for B1,B2,B3,B4 and 50 GB for S1,S2,S3. The processor capacity is $10^6$ instructions/sec for U1, U2, . . . , U12 and $5 \times 10^6$ instructions/sec for B1,B2,B3,B4 and $10^7$ instructions/sec for S1,S2,S3. The link capacity (in both directions) is 40 Gbps for the links between the bottom layer to the second layer (U1,B1), (U2,B1), . . . , (U11,B4), (U12,B4) and 200 Gbps for (B1,B2), (B2,B3), (B3,B4), (B1,S1), (B2,S1), (B3,S2), (B4,S2) and 400 Gbps for (S1,S2), (S1,S3), (S2, S3). In the GÉANT topology, the cache capacity is 30 GB and the processor capacity is $25 \times 10^5$ instructions/sec for all the nodes. The link capacity (in both directions) is 240 Gbps for all the links. In the LHC topology, for "MIT", "WSC", "PRD", "FNL", "VND", "UFL", "NBR" and "UCSD", the cache capacity is 3 TB and processing capacity is 3000, 5000, 5000, 2000, 1000, 1000, 3000, and 2000 instructions/sec respectively. The Cache and processor capacity is zero for all other nodes. The link capacity (in both directions) is 480 Mbps for all links. The designated source for each data object is chosen uniformly at random among the source nodes mentioned in Table 1. At each requesting node, computation requests arrive according to a Poisson process with an overall rate A (in request/node/sec). Each arriving request selects from the set of available tasks (independently) uniformly at random. In the Abilene, Fog and GÉANT, the ith computation task is paired with ith data object to form a computation request. In the LHC, a data object is selected from the available data objects (independently) according to a Zipf distribution with parameter 1 and the selected task is paired with the selected data object to form a computation request.

The shortest paths from each node to the source for each data object acre calculated and the forwarding tables of the nodes are populated with this information beforehand. In all topologies, the buffers holding the computation interest packets, data interest packets, data packets and result packets are assumed to have infinite size. Data packets and result packets share the same queue on the reverse paths and are served on a First-Come-First-Served basis.

Policies and Measurements. DECO is compared with five baseline policies in terms of computation request satisfaction delay. In the RD-LRU policy, RD stands for "Retrieve Data": each computation request is performed at the entry node of the request and if necessary, a data interest packet is generated according to the procedure previously discussed herein. All data interest packets in each node share one queue and are forwarded to the source on a first-come-first-served basis. Each node caches the data objects when they travel back on the reverse path to the requesting node and if the cache is full, nodes use Least Recently Used (LRU) as cache eviction policy. The RD-LFU is similar to the RD-LRU policy but uses Least Frequently Used (LFU) as its cache eviction policy. In the STS policy, STS stands for "Send To Source" and each computation request (m,k) is forwarded to the source of the data object k. All computation requests share the same queue at each node and are forwarded on a first-come-first-served basis. When the computation requests reach the data source they are sent to the processor queue directly. There is no caching in this policy. In the CBP-LRU policy, CBP stands for "Computation Backpressure". There is a separate queue for the computation interest packets of type (m,k) at each node. Backpressure-based computer-implemented methods are used on the computation interest packets for performing computations and forwarding, similar to the approach introduced by Feng, et al. (see Feng, H., et al., "Optimal Dynamic Cloud Network Control," In *IEEE/ACM Transactions on Networking*, pages 1-14, 2018). Since all the result sizes and computation loads are equal, the policy performs the most backlogged computation request at each node. Also, the forwarding is done by simple backpressure on each outgoing link subject to the reverse link capacity normalized by the result size.

The data interest packets all share the same queue and are forwarded on a First-Come-First-Served basis toward the sources of the data objects. Each node uses LRU as its cache eviction policy. The CBP-LFU is similar to CBP-LRU policy but uses LFU.

The simulator finest granularity time step is 2 μsec for the Abilene, Fog and GÉANT topology, and is 1 msec for the LHC topology. In the DECO policy, virtual plane and actual plane decisions are carried out in the slots of length $10^4$ time steps and the averaging window size is $10^6$ time steps. In the CBP-LRU and CBP-LFU policies, computer-implemented backpressure methods for performing computations and forwarding are carried out in the slots of length $10^4$ time steps. The average window size in all policies that utilize LFU is $10^6$ time steps. The simulator generates computation requests for 100 seconds in the Abilene, Fog and GÉANT topology, and 50000 seconds in the LHC topology. After generating requests, simulator waits for all computation requests to be satisfied. The delay of each computation request is calculated as the difference between the fulfillment time (i.e., time of arrival of the last result packet) and the creation time of the computation interest packet. A sum over all the delays is divided by the total number of generated requests and the number of requesting nodes. The computation request satisfaction delay (in second per request per node) is plotted for different arrival rates (in number of requests per node per second) for each topology in FIGS. 11A-D.

The DECO policy outperforms all other schemes by a large margin. For instance, at an arrival rate of λ=45, DECO has around 80% delay improvement in the Abiline topology and 90% delay improvement in the GÉANT topology compared to the next closest policy. Another observation is that the second best policy may vary from STS, RD-LFU, or CBP-LFU depending on the size of data objects, computation load, caching, processing and link capacities in each topology. None of the baseline methods are competitive with DECO, which takes local demand for both computation and data into account for decision making.

While example embodiments have been particularly shown and described, it will be understood by those skilled in the art that various changes in form and details may be made therein without departing from the scope of the embodiments encompassed by the appended claims.

What is claimed is:

1. A node configured to be used in a data distribution network, the node comprising:
   a processor and a non-transitory computer-readable medium having processor instructions stored thereon, the processor configured to load and execute the instructions that, when executed, cause the node to be configured to:
   exchange computation request counters and data request counters with neighboring nodes in the network, the computation request counters exchanged representing demand for computations, the data request counters exchanged representing demand for data objects; and
   update a local joint policy to define rules to govern calculations used to make decisions to cache at the node, the local joint policy updated based on the computation request counters exchanged and the data request counters exchanged.

2. The node of claim 1, wherein the node is further configured to perform functions of a virtual plane and an actual plane, wherein, to perform functions of the virtual plane, the node is further configured to update the local joint policy and update respective joint policies local to the neighboring nodes, and wherein, to perform functions of the actual plane, the node is further configured to:
   perform computations according to the local joint policy and the respective joint policies to service a computation request;
   forward the computation request or representation thereof or a data request for at least a portion of a data object to other nodes of the data distribution network according to the local joint policy and the respective joint policies local to the neighboring nodes; and
   cache the at least a portion of the data object according to the local joint policy and the respective joint policies local to the neighboring nodes.

3. The node of claim 1, wherein the node is further configured to service a computation request having a maximum difference and wherein the neighboring nodes are configured to service a computation request having the maximum difference.

4. The node of claim 1, wherein the node is further configured to update the local joint policy and wherein, to update the local joint policy, the node is further configured to:
   calculate respective normalized maximum computation request backlogs and respective normalized maximum data request backlogs for computation requests of one or more queues at the node according to the local joint policy, the backlogs being differences between counters of the node and corresponding counters of the neighboring nodes; and
   determine a maximum among the respective normalized maximum computation request backlogs and the respective normalized maximum data request backlogs according to the local joint policy to identify a computation request or representation thereof or a data request for at least part of a data object to forward to the neighboring nodes, and wherein the node is further configured to forward the identified computation request or representation thereof or data request for the at least part of the data object to the neighboring nodes.

5. The node of claim 1, wherein the node is further configured to:
   update the local joint policy by calculating a maximum possible total cache score for data objects in a cache at the node according to the local joint policy, data objects presently in the cache and data objects otherwise presently available at the node; and
   cache data objects to achieve the calculated maximum possible total cache score at the node.

6. The node of claim 5, wherein:
   a cache score of a data object at the node is a time-average of a number of times the data object is received at the node or used in performing a computation to service a computation request of one or more queues at the node; and
   the respective cache scores of data objects at the neighboring nodes are time-averages of a number of times the data objects are received at the respective neighboring nodes or used in performing a computation to service a computation request of one or more queues at the respective neighboring nodes.

7. The node of claim 1, further comprising respective processors and non-transitory computer-readable media located at the node and the neighboring nodes, the computer-readable media having processor instructions stored thereon, the respective processors configured to load and execute the instructions that, when executed, cause the node and the respective neighboring nodes to service the computation request according to the respective joint policies local to the node and respective joint policies local to the respective neighboring nodes in a distributed network manner.

8. A node configured to be used in a data distribution network, the node comprising a processor and a non-transitory computer-readable medium having processor instructions stored thereon, the processor configured to load and execute the instructions that, when executed, cause the node to be configured to:
perform computations according to a local joint policy to service a computation request; and
forward results of the computations performed toward an entity that submitted the computation request, wherein the local joint policy includes calculating a difference between respective computation request counters for computation requests of one or more queues at the node and respective data request counters for the computation requests of the one or more queues, the respective computation request counters representing demand for computations, the respective data request counters representing demand for data objects.

9. The node of claim 8, wherein the node is further configured to perform functions of a virtual plane and an actual plane, the functions of the virtual plane including a self-determination of the local joint policy; the functions of the actual plane including the performing of computations according to the local joint policy to service the computation request; the functions of the actual plane further including the forwarding of the computation request or representation thereof or at least a portion of a data object to neighboring nodes according to the local joint policy; the functions of the actual plane further including caching the at least a portion of the data object according to the local joint policy.

10. The node of claim 8, wherein the local joint policy includes servicing a computation request having a maximum difference.

11. The node of claim 8, wherein the local joint policy includes:
a calculation of a normalized maximum computation request backlog and a normalized maximum data request backlog for computation requests of one or more queues at the node, the backlogs being differences between counters of the node and corresponding counters of neighboring nodes; and
a determination of a maximum among the normalized maximum computation request backlog and the normalized maximum data request backlog to identify a computation request or representation thereof or a data request for at least part of a data object to forward to neighboring nodes.

12. The node of claim 8, wherein the node is further configured to make a self-determination in accordance with the local joint policy and wherein the local joint policy includes calculating of a maximum possible total cache score for data objects in a cache at the node given data objects in the cache at the time of the self-determination and data objects otherwise available at the time of the self-determination at the node.

13. The node of claim 12, wherein a cache score of a data object is a time-average of a number of times the data object is received at the node or used in performing a computation to service a computation request of one or more queues at the node.

14. The node of claim 8, wherein, for a computation request including a plurality of independent tasks, the node is further configured to forward at least one task of the computation request or representation thereof to neighboring nodes, the neighboring nodes executing a respective local joint policy to enable the neighboring nodes to determine whether to service the at least one task of the computation request.

15. A method of servicing a computation request submitted by an entity to a node of a distribution network, the method comprising:
performing computations according to a local joint policy to service the computation request; and
forwarding results of the computations performed toward the entity that submitted the computation request, wherein the local joint policy includes calculating a difference between respective computation request counters for one or more computation requests of one or more queues at the node and respective data request counters for the computation requests of the one or more queues, the respective computation request counters representing demand for computations, the respective data request counters representing demand for data objects.

16. The method of claim 15, further comprising performing functions of a virtual plane and an actual plane, the functions of the virtual plane including a self-determination of the local joint policy; the functions of the actual plane including:
performing computations according to the local joint policy to service the computation request;
forwarding the computation request or representation thereof or at least a portion of a data object to neighboring nodes according to the local joint policy; and
caching the at least a portion of the data object according to the local joint policy.

17. The method of claim 15, wherein the local joint policy includes servicing a computation request having a maximum difference.

18. The method of claim 15, wherein the local joint policy includes:
calculating a normalized maximum computation request backlog and a normalized maximum data request backlog for computation requests of one or more queues at the node, the backlogs being differences between counters of the node and corresponding counters of the neighboring nodes; and
determining a maximum among the normalized maximum computation request backlog and the normalized maximum data request backlog to identify a computation request or representation thereof or a data request for at least part of a data object to forward to neighboring nodes.

19. The method of claim 16, further comprising making a self-determination in accordance with the local joint policy, wherein the local joint policy includes calculating a maximum possible total cache score for data objects in a cache at the node given data objects in the cache at the time of the self-determination and data objects otherwise available at the time of the self-determination at the node, and wherein a cache score of a data object is a time-average of a number of times the data object is received at the node or used in performing a computation to service a computation request of one or more queues at the node.

20. The method of claim 15, further comprising, for a computation request including a plurality of independent tasks, forwarding at least one task of the computation request or representation thereof to neighboring nodes, the neighboring nodes executing a respective local joint policy to enable the neighboring nodes to determine whether to service the at least one task of the computation request.

* * * * *